June 11, 1957  J. D. ROSSIER  2,795,028
METHOD FOR MAKING CLAY PIPE OR THE LIKE
Original Filed Aug. 20, 1951                    12 Sheets-Sheet 1
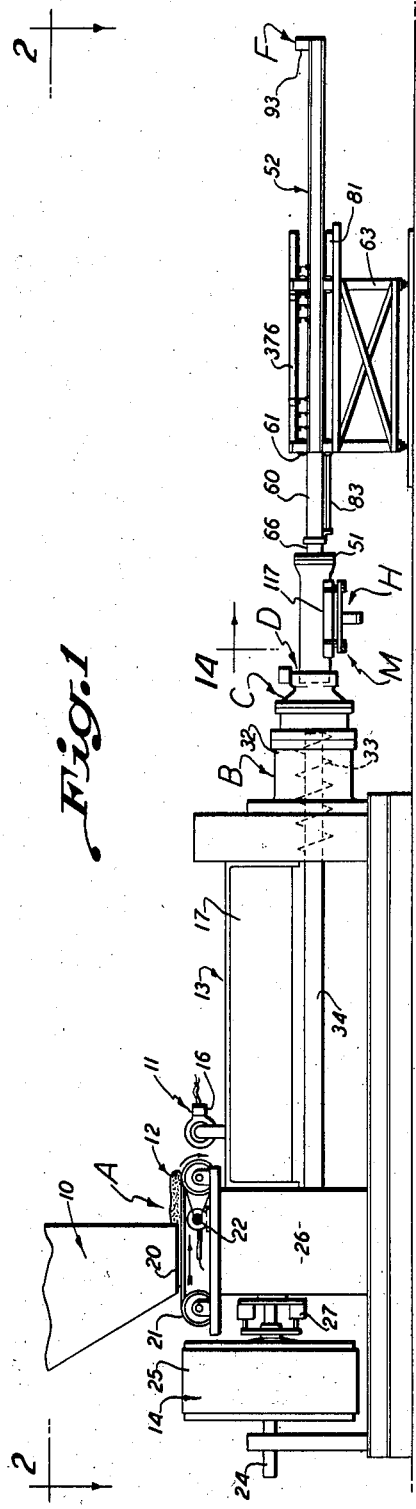
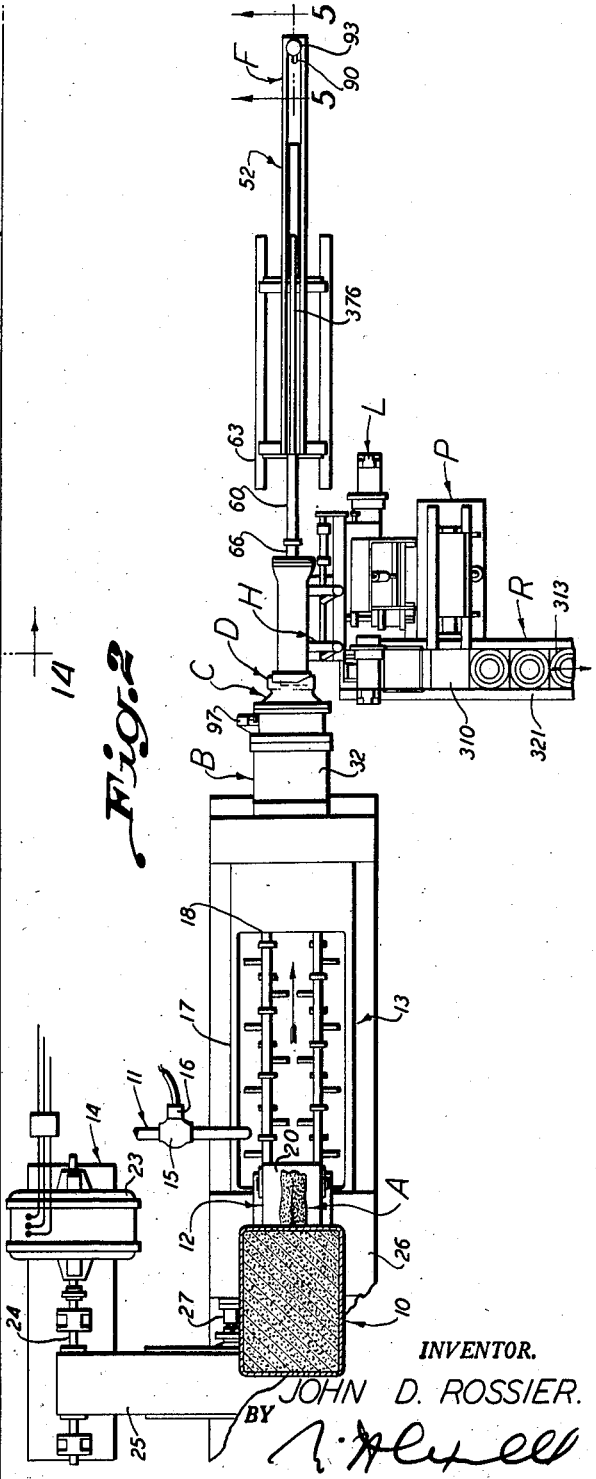
INVENTOR.
JOHN D. ROSSIER.
BY
Attorney.

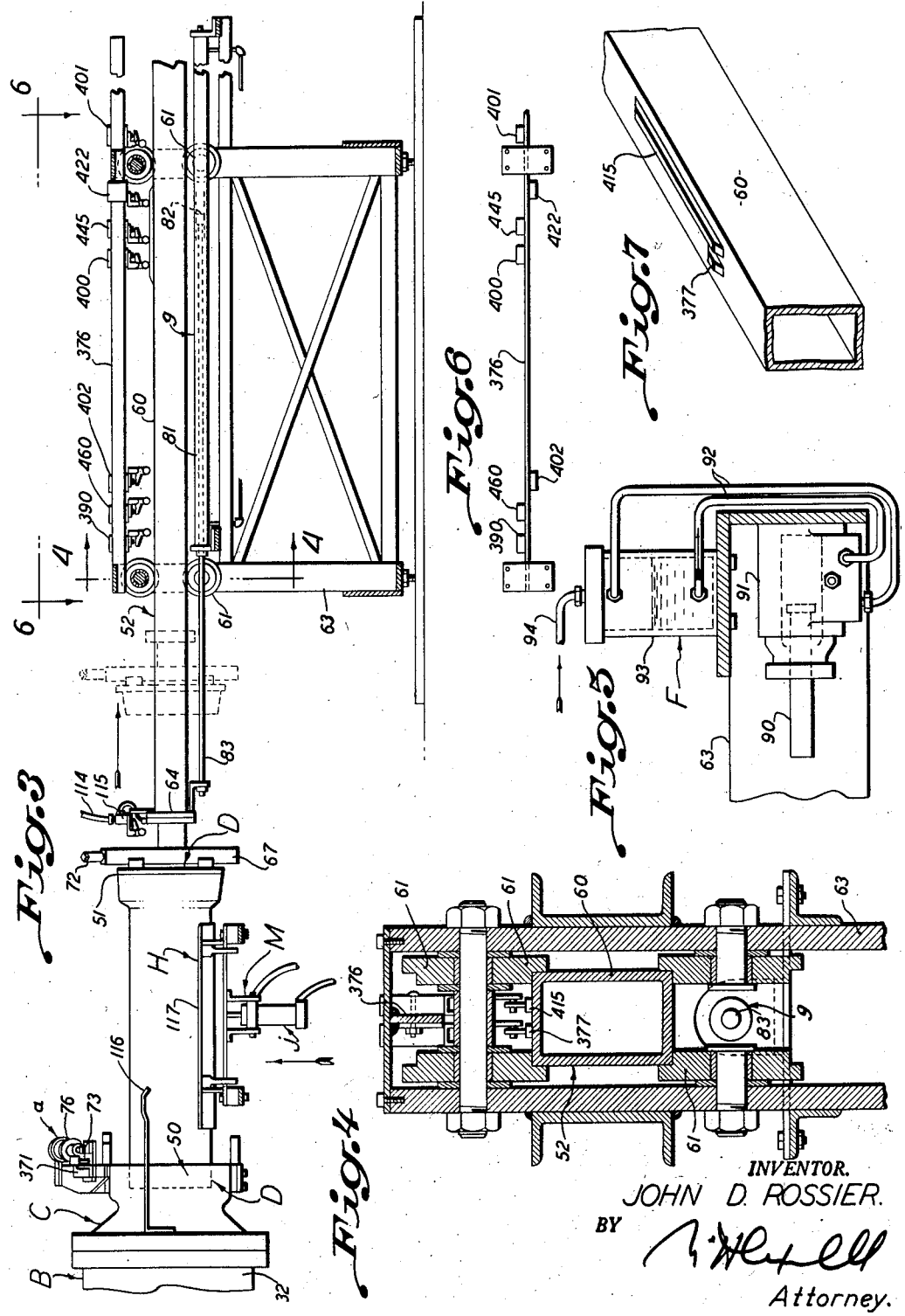

June 11, 1957     J. D. ROSSIER     2,795,028
METHOD FOR MAKING CLAY PIPE OR THE LIKE
Original Filed Aug. 20, 1951     12 Sheets-Sheet 3
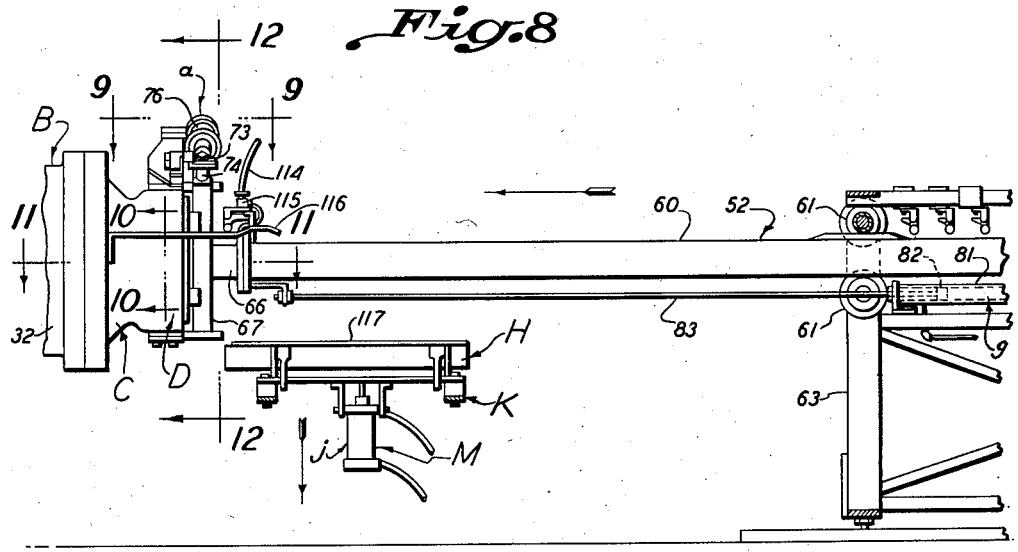
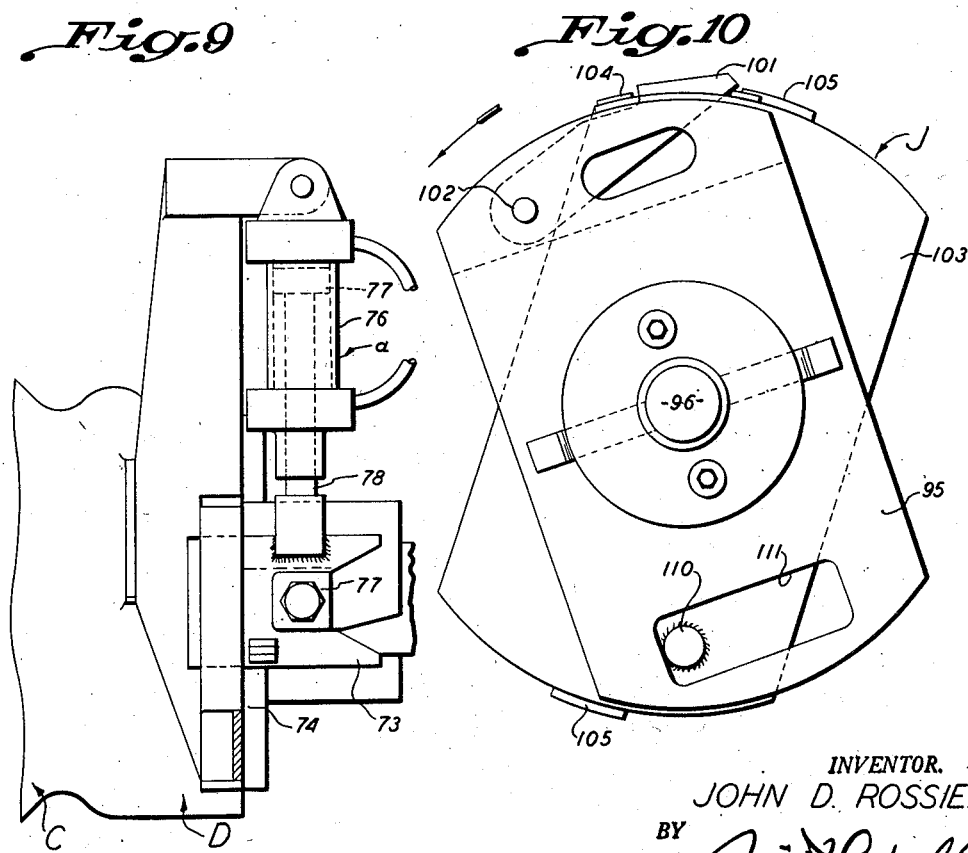
INVENTOR.
JOHN D. ROSSIER.
BY
Attorney.

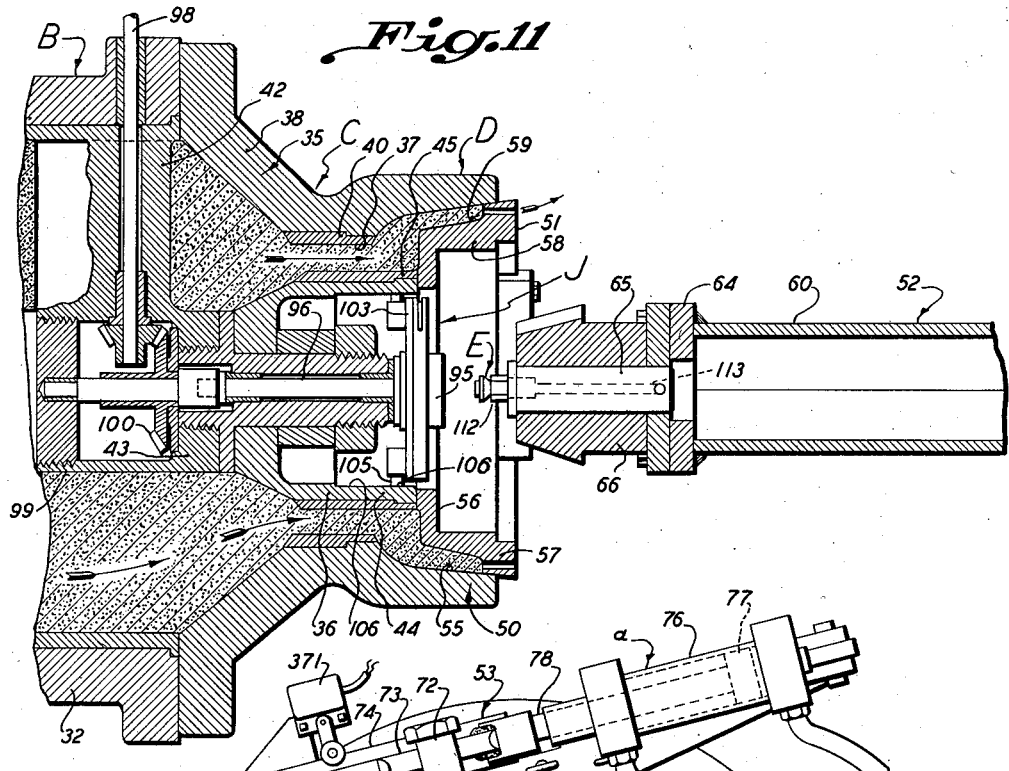
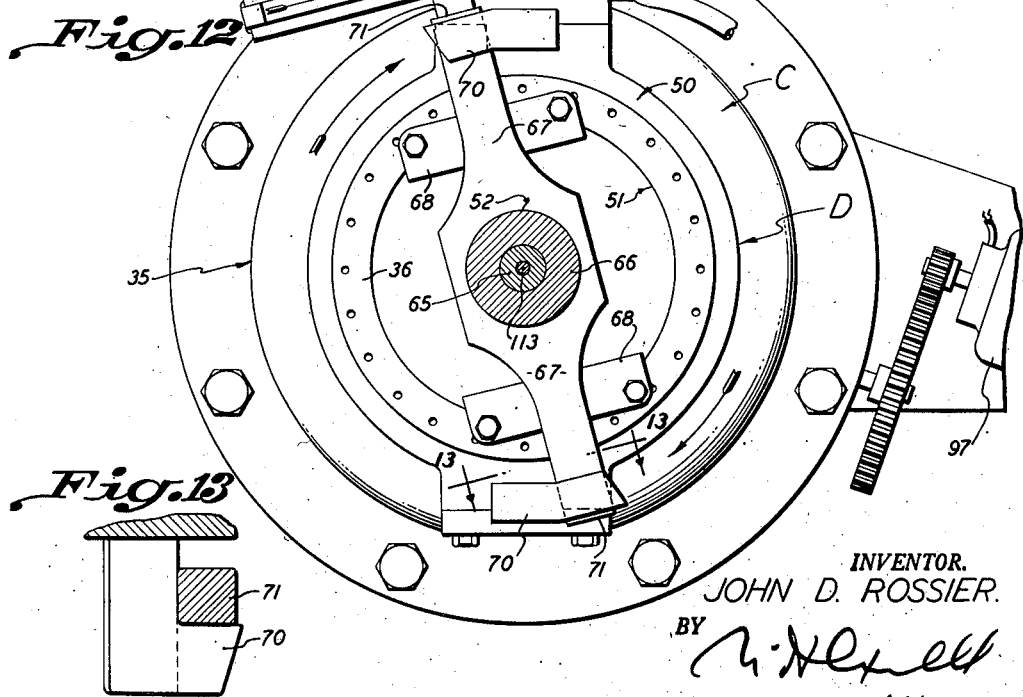
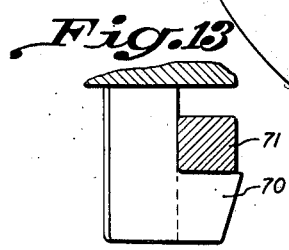

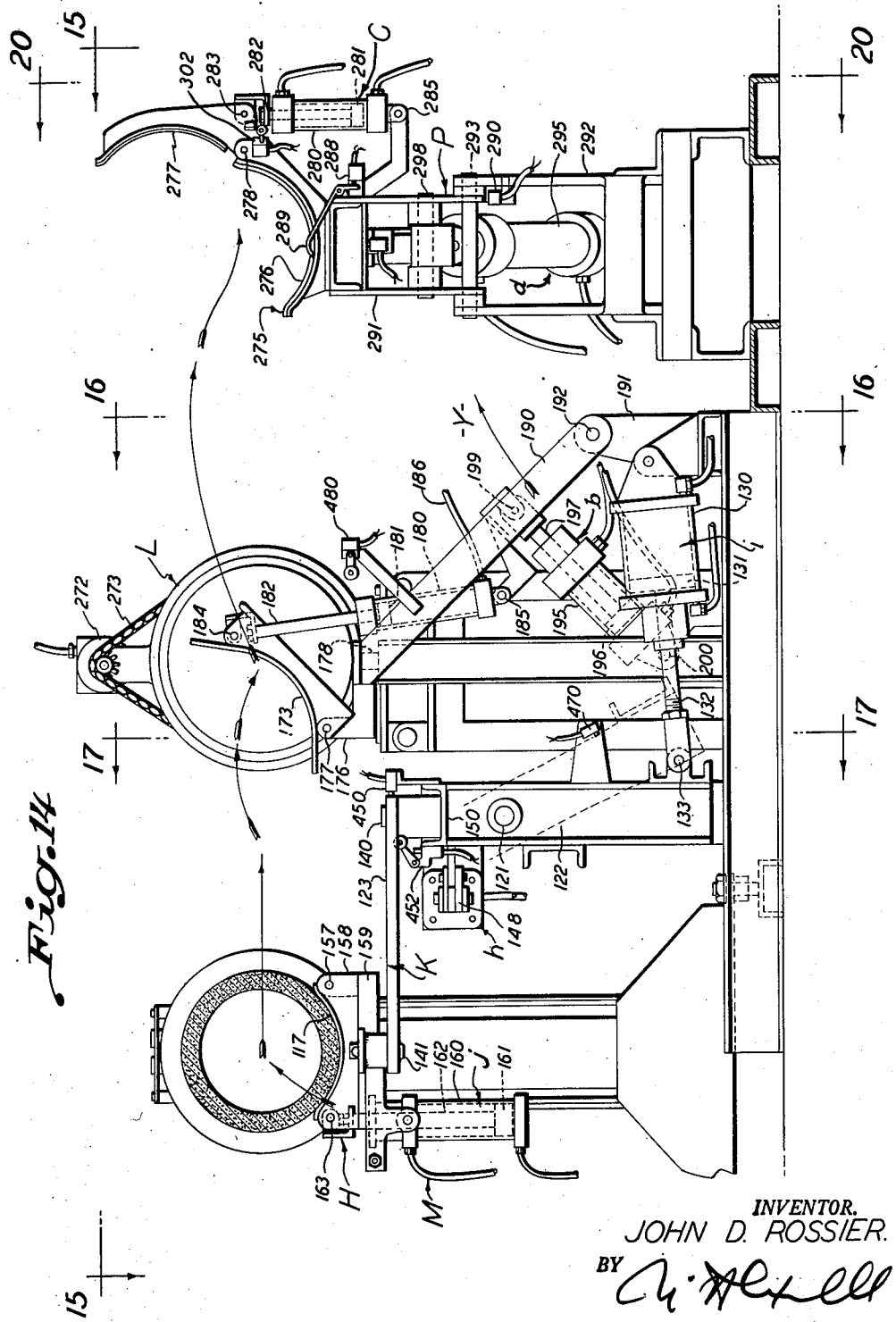

June 11, 1957 J. D. ROSSIER 2,795,028
METHOD FOR MAKING CLAY PIPE OR THE LIKE
Original Filed Aug. 20, 1951 12 Sheets-Sheet 6
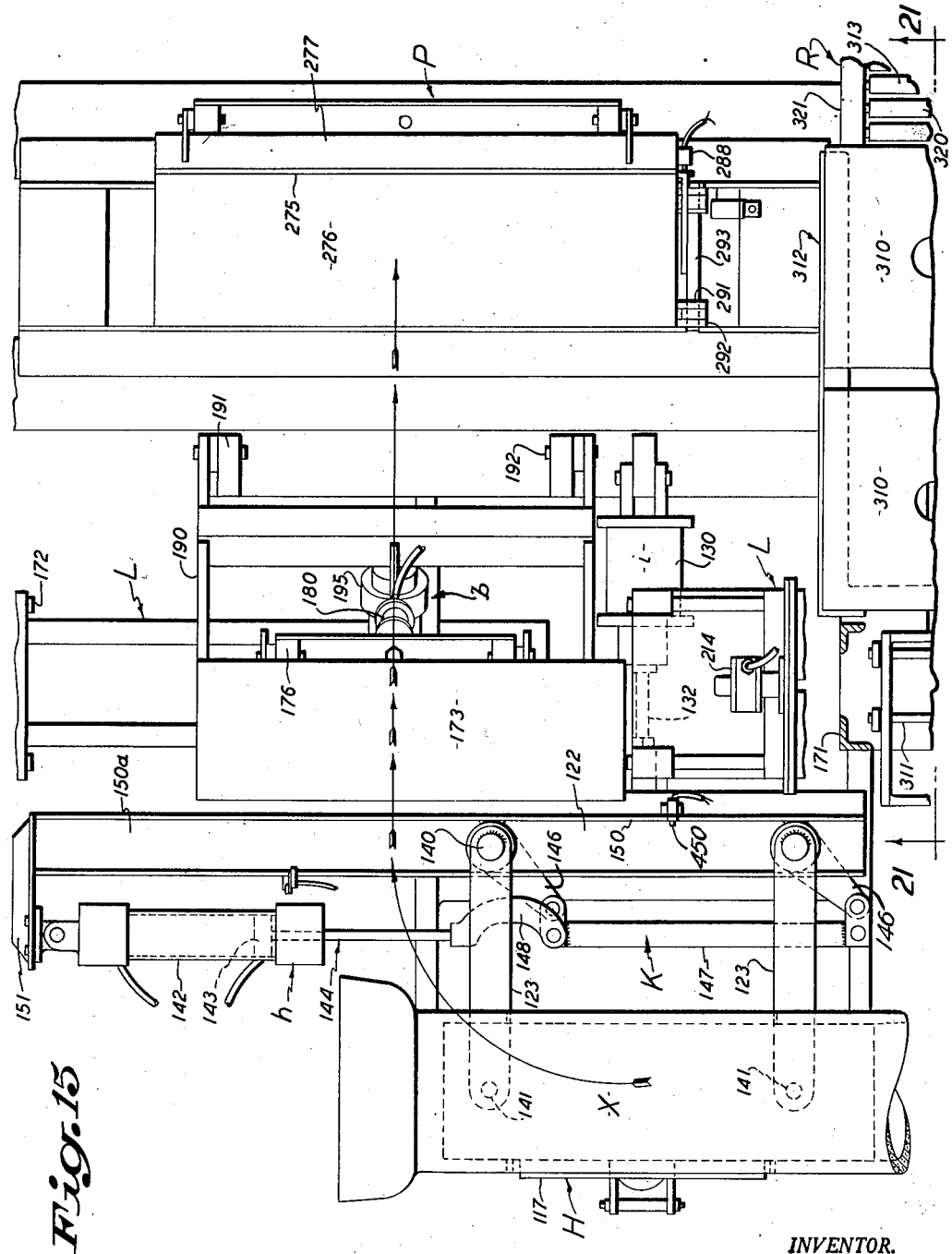
Fig.15
INVENTOR.
JOHN D. ROSSIER.
BY
Attorney.

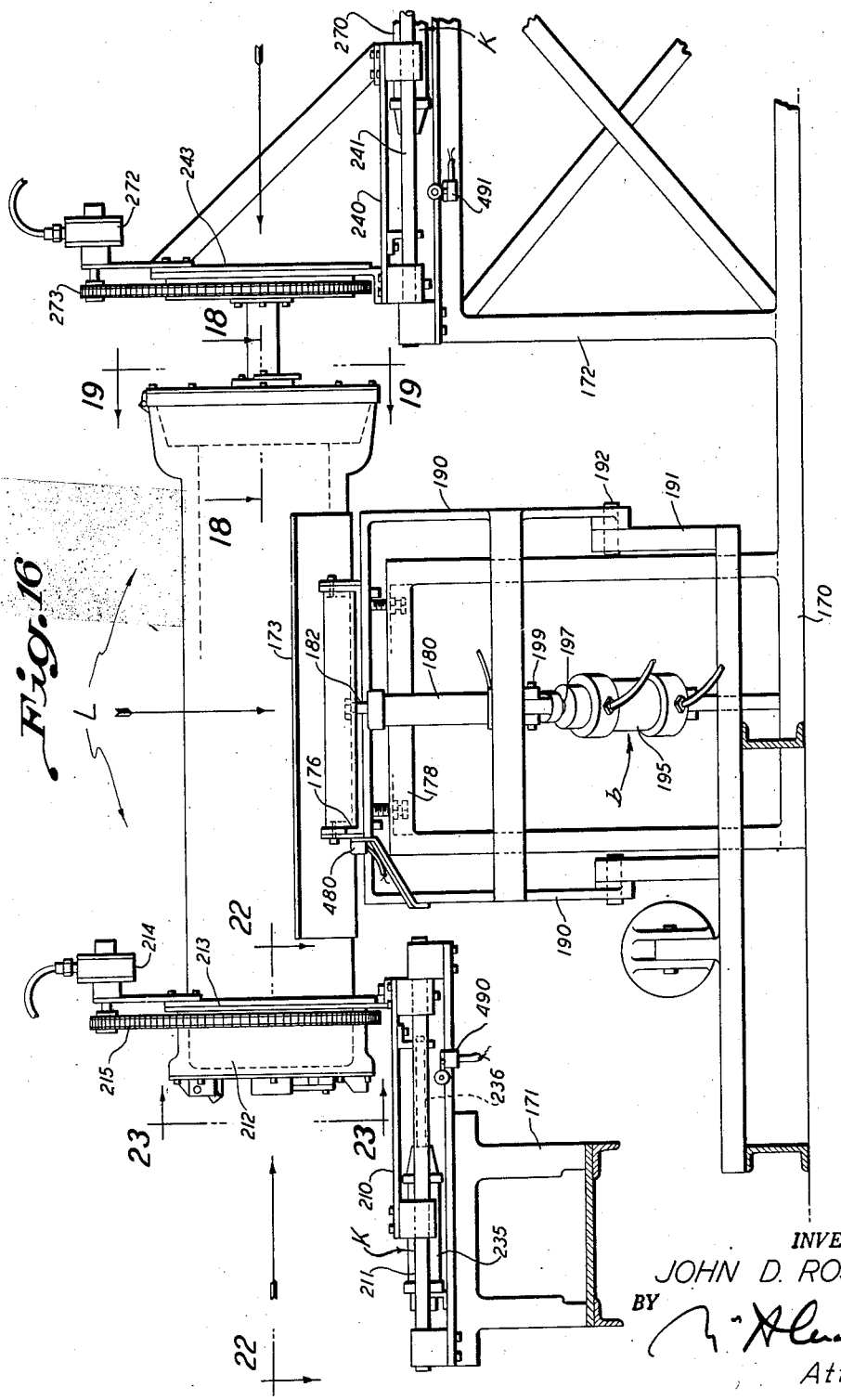

June 11, 1957     J. D. ROSSIER     2,795,028
METHOD FOR MAKING CLAY PIPE OR THE LIKE
Original Filed Aug. 20, 1951     12 Sheets-Sheet 8
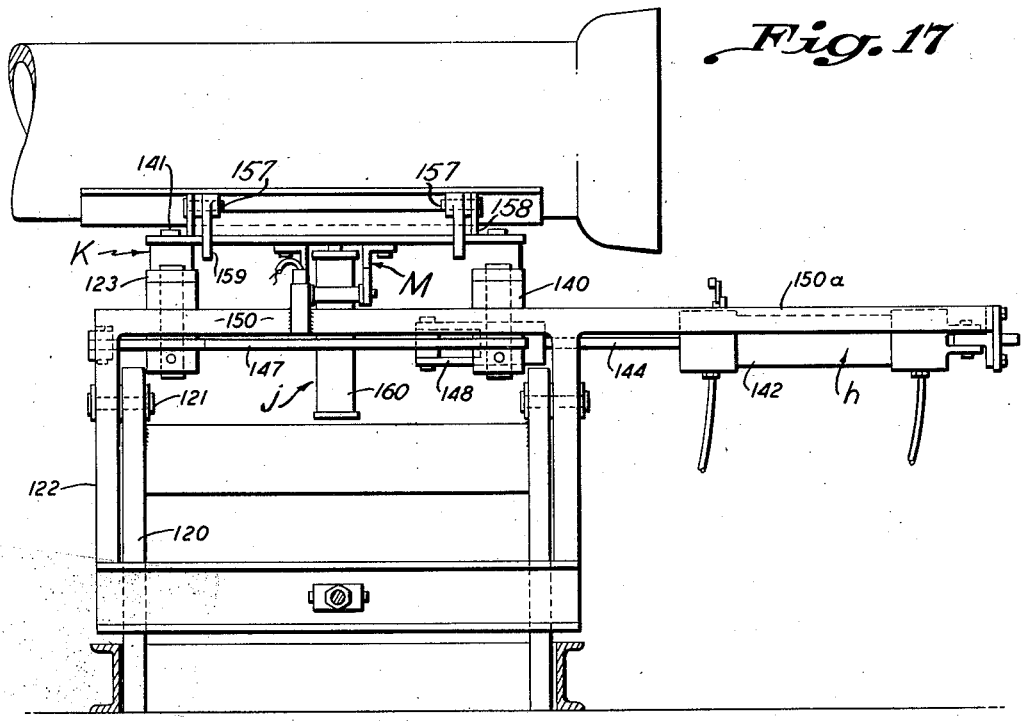
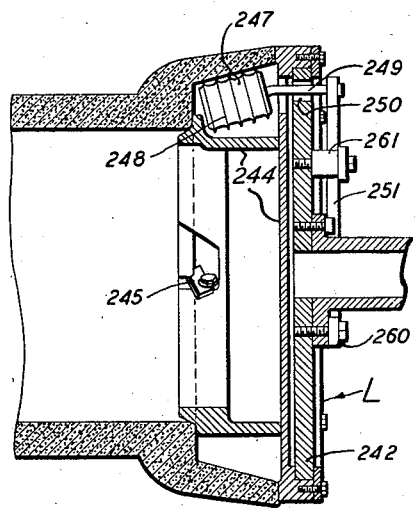
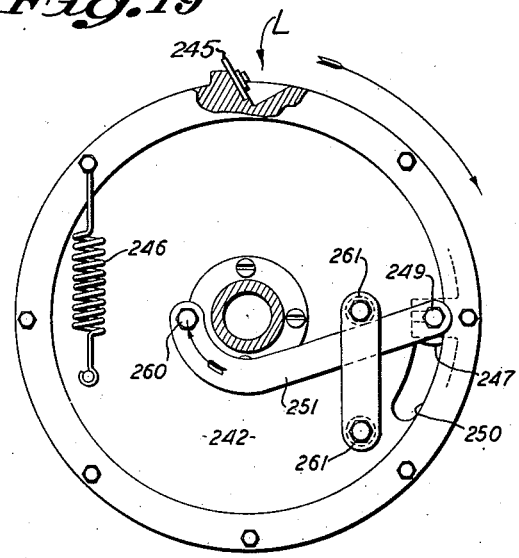
INVENTOR.
JOHN D. ROSSIER.
BY
Attorney.

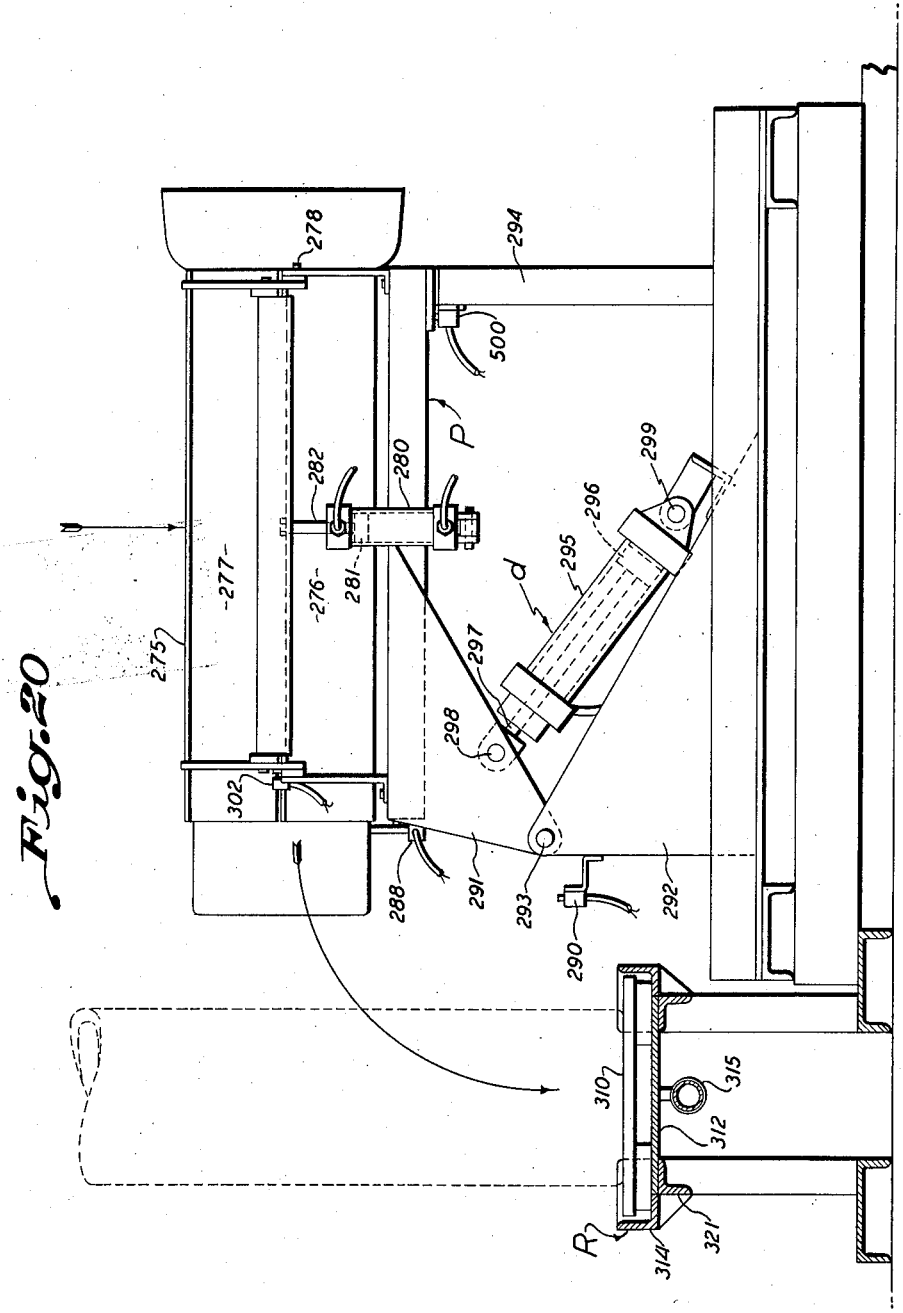

June 11, 1957  J. D. ROSSIER  2,795,028
METHOD FOR MAKING CLAY PIPE OR THE LIKE
Original Filed Aug. 20, 1951  12 Sheets-Sheet 10
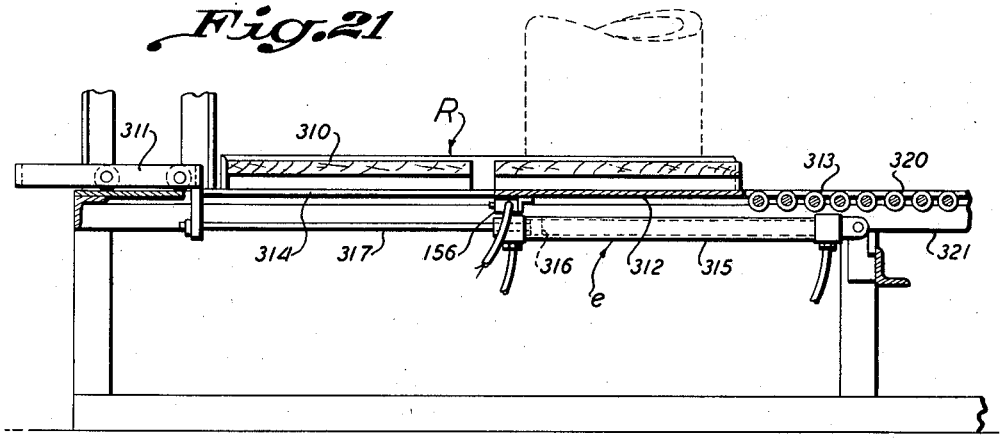
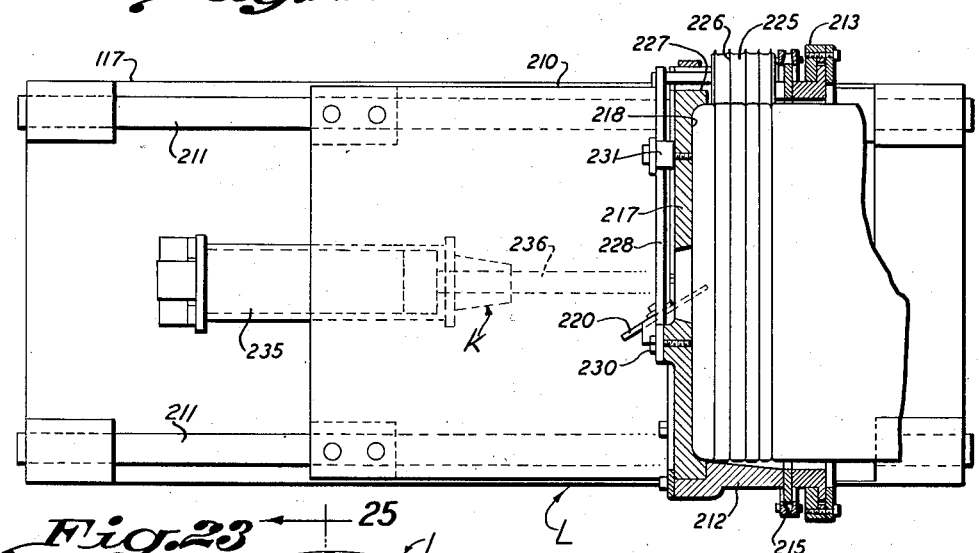
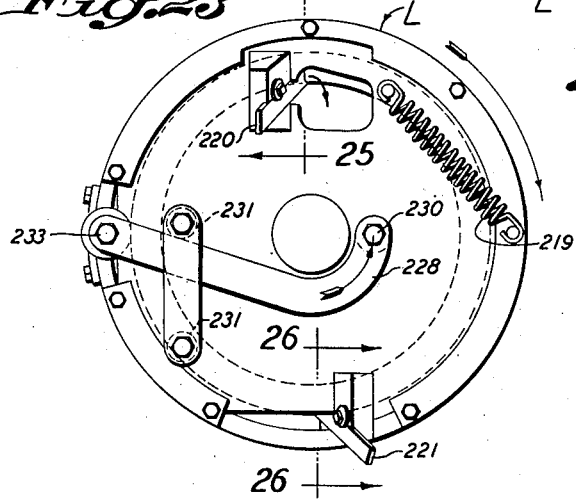
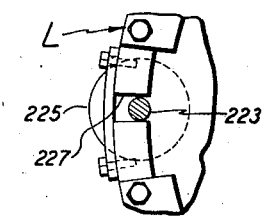
INVENTOR.
JOHN D. ROSSIER.
BY
Attorney.

June 11, 1957 J. D. ROSSIER 2,795,028
METHOD FOR MAKING CLAY PIPE OR THE LIKE
Original Filed Aug. 20, 1951 12 Sheets-Sheet 11
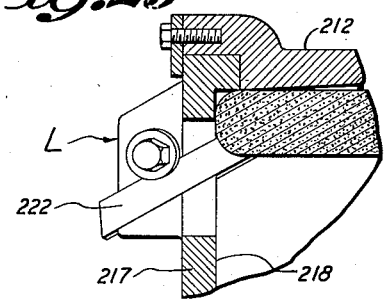
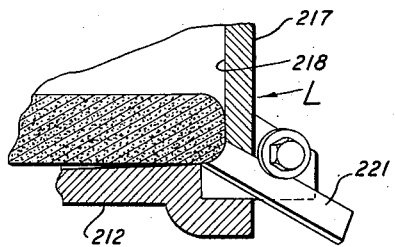
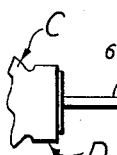
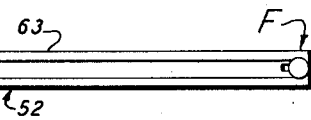
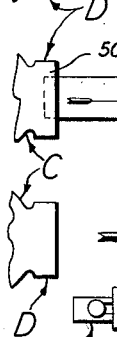
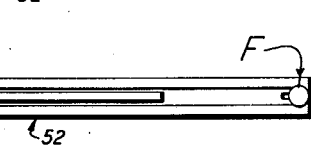
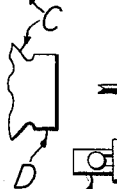
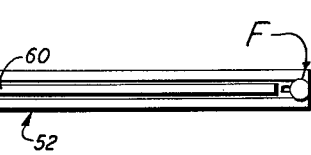
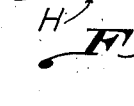
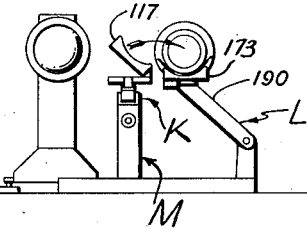
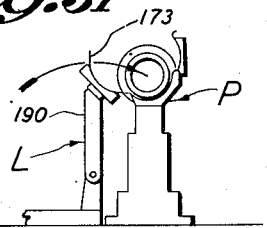
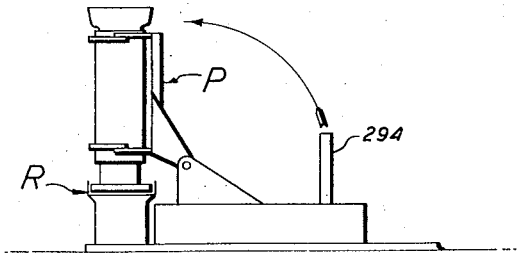
INVENTOR.
JOHN D. ROSSIER.
BY
Attorney.

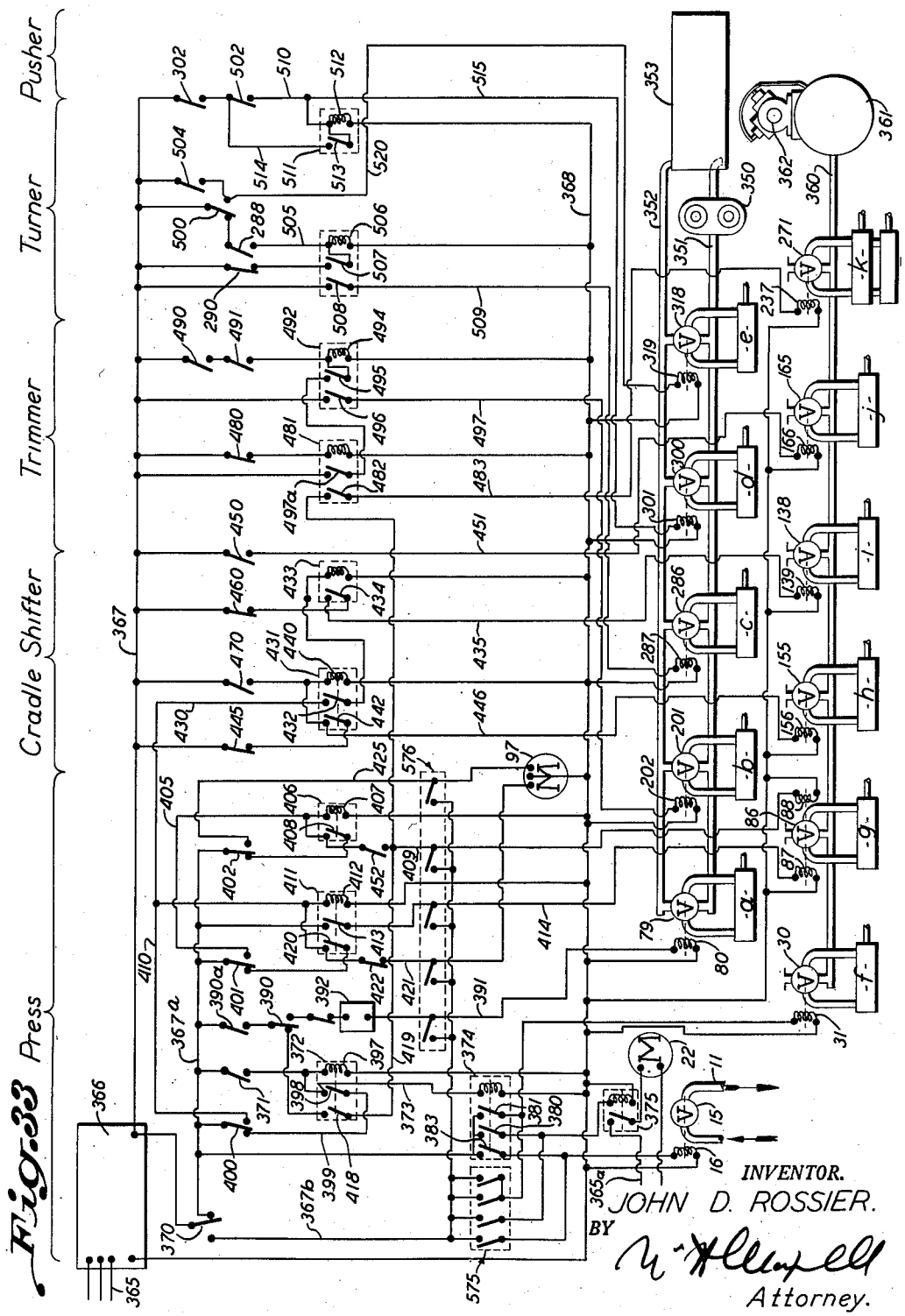

United States Patent Office 2,795,028
Patented June 11, 1957

2,795,028

METHOD FOR MAKING CLAY PIPE OR THE LIKE

John D. Rossier, Compton, Calif., assignor, by mesne assignments, to Pearne & Lacy Machine Company, Los Angeles, Calif., a corporation of California Division of application Serial No. 242,593, August 20, 1951. Continuation of application Serial No. 333,178, January 26, 1953. This application January 16, 1957, Serial No. 634,583

10 Claims. (Cl. 25—156)

This invention is concerned with a method for making clay pipe, or the like, and it is a general object of the invention to provide a simple, dependable, practical, and automatic pipe making method for forming raw materials into clay which is formed horizontally into pipe, which pipe is delivered vertically disposed on pallets, finished and ready for drying preliminary to firing.

By virtue of being a continuation of my copending application Serial No. 333,178, filed January 26, 1953, and now abandoned, this application is, in effect, a division of my copending application, Serial No. 242,593, filed August 20, 1951, for "Machine for Making Clay Pipe or the Like," the latter also having been abandoned in favor of a continuation application filed concurrently herewith.

It is well recognized that clay products, such as clay pipe or the like, are commercially produced from raw materials which are mixed to form a clay that is extruded and belled, following which the formed objects are generally arranged vertically for drying preliminary to being fired. In practice, commercial production of such clay products, particularly when the sizes are such as are used in sewage systems and the like, requires the supply of a large quantity of clay and generally requires the drying and firing of the formed products in an upright or vertical position. Further, in the case of standard or popularly used sizes or forms, rapid and economical production is important.

It is common practice in the production of clay products, such as clay pipe, even where large quantities are produced, to mix clay as by continuously operating clay forming apparatus and to handle the clay from such a source in an extruding device, combined with which are mechanisms for belling the extruded forms, and the formed units are then finished and conveyed or carried away in part or wholly by hand to be finally stored for drying and subsequent firing.

It is another object of this invention to provide an automatic method of making clay pipe characterized by extruding clay horizontally and maintaining the extrusion under compression until it is received by a support, following which the extrusion is severed for establishing a pipe unit subject to being mechanically trimmed and otherwise handled or manipulated as circumstances require.

It is another object of this invention to provide a method for making clay pipe which includes extruding clay horizontally and maintaining the extrusion under compression lengthwise until the extrusion is supported, following which it is relieved of pressure and severed for establishing a unit which is mechanically shifted and maintained in a fully supported condition until finally deposited and freed in an upright or vertically disposed position from which it can be shifted bodily as desired.

The method provided by this invention is characterized, generally, by the maintenance of a horizontally disposed extrusion under compression as the extrusion occurs, followed by support of the extrusion prior to the compression being released, so that when the extrusion is cut to establish a free length of pipe, it is supported and the operation carried out without sagging or deformation of the extruded material. The method further contemplates the automatic handling of the pipe horizontally during extrusion in the manner just stated, and preferably also during its subsequent passage to and through a trimming mechanism that trims the ends of the pipe, and finally shifting the pipe to a vertical position, in the course of which it is at all times maintained effectively supported or even gripped during turning from the horizontal to the vertical position, with the result that the finally delivered pipe is free of deformation. The various aspects of the method will be apparent and fully understood from a consideration of the following description of the machine that I have provided and which serves to carry out the method.

The various objects and features of my invention can best be described in connection with a detailed description of a typical preferred form of apparatus suitable for carrying out the method of the invention, throughout which description reference is made to the accompanying drawings, in which:

Fig. 1 is a side elevation of the machine provided by the invention showing a pipe ready to be severed. Fig. 2 is a plan view of the machine, being a view taken as indicated by line 2—2 on Fig. 1. Fig. 3 is an enlargement of a portion of the structure shown in Fig. 1, certain of the parts being shown in section to illustrate details of construction, the parts being shown positioned as they are when an initially formed pipe with a belled end is supported and ready to be cut. Fig. 4 is an enlarged detailed transverse sectional view taken as indicated by line 4—4 on Fig. 3. Fig. 5 is an enlarged detailed sectional view taken substantially as indicated by line 5—5 on Fig. 2. Fig. 6 is a plan view of a portion of the structure taken as indicated by line 6—6 on Fig. 3. Fig. 7 is a perspective view of a portion of the element that cooperates with the parts shown in Fig. 6. Fig. 8 is a view similar to a portion of Fig. 3 showing the parts positioned as they are in the course of the bell being formed on the pipe. Fig. 9 is an enlarged detailed view taken substantially as indicated by line 9—9 on Fig. 8. Fig. 10 is an enlarged view of the cutter alone, showing it as it appears when viewed in the direction indicated by line 10—10 on Fig. 8. Fig. 11 is an enlarged detailed plan section taken as indicated by line 11—11 on Fig. 8. Fig. 12 is an enlarged sectional view taken as indicated by line 12—12 on Fig. 8. Fig. 13 is a section taken as indicated by line 13—13 on Fig. 12. Fig. 14 is an enlarged transverse sectional view of the machine taken substantially as indicated by line 14—14 on Fig. 1. Fig. 15 is a plan view of the parts shown in Fig. 14, being a view taken as indicated by line 15—15 on Fig. 14. Fig. 16 is a vertical sectional view taken as indicated by line 16—16 on Fig. 14. Fig. 17 is a vertical sectional view taken as indicated by line 17—17 on Fig. 14. Fig. 18 is an enlarged detailed plan section of a portion of the trimming means showing the parts that trim the belled end of the pipe, being a view taken substantially as indicated by line 18—18 on Fig. 16. Fig. 19 is an end view of the parts shown in Fig. 18, being a sectional view taken as indicated by line 19—19 on Fig. 16 and showing certain of the parts broken away to appear in section. Fig. 20 is a vertical sectional view taken substantially as indicated by line 20—20 on Fig. 14. Fig. 21 is a view taken substantially as indicated by line 21—21 on Fig. 15. Fig. 22 is an enlarged detailed plan section taken substantially as indicated by line 22—22 on Fig. 16. Fig. 23 is an end view of parts shown in Fig. 22, being a view taken as indicated by line 23—23 on Fig. 16. Fig. 24 is an enlarged view of a portion of the structure shown in Fig. 23. Fig. 25 is an enlarged detail of a portion of the structure shown in Fig. 23, being a view taken in the direction indicated by the line 25—25 on Fig. 23. Fig. 26 is an enlarged detail of a portion of the structure shown in Fig. 23, being a view taken as indicated by line 26—26 on Fig. 23. Figs. 27 to 32, inclusive, are diagrammatic views illustrating various steps in the process of manufacture carried out by the machine of the present invention. Fig. 27 indicates the positioning of parts as the bell is formed. Fig. 28 indicates the positioning of parts when the pipe has been initially formed and belled and is ready to be cut. Fig. 29 indicates the positioning of parts that occurs as the belled pipe is being removed from the axis of extrusion illustrated in Figs. 27 and 28. Fig. 30 is a view illustrating the transfer of the pipe to the trimming means. Fig. 31 illustrates transfer of the pipe from the trimming means to the mechanism that finally delivers it in an upright position, as illustrated in Fig. 32. Fig. 33 is a combination electrical and hydraulic circuit diagram illustrating, in a general way, the control system and interconnection of parts as provided by the present invention, and in particular the relationship of fluid pressure actuated units and their control valves and the electrical actuators for such valves, certain of which features are not otherwise shown in the drawings.

The present invention contemplates, generally, the production of units such as belled clay pipes, and the method serves to produce such units in a form and position ready for drying and starts operation with the raw or basic materials that enter into the pipe. In accordance with the broader principles of the invention, various units, objects, or articles may be formed, but since belled clay pipe presents a typical and practical example, this particular product will be referred to in detail, but reference to it is not to be construed as in any way limiting or restricting the invention or those aspects of the invention which are applicable to other products.

It is believed that the various steps or phases of the present method will be best understood by describing them in the course of the following detailed description of the typical machine or apparatus depicted in the various views of the drawings.

The machine illustrated for carrying out the invention is specifically claimed in the above identified continuation application filed concurrently herewith. That machine provides a means A supplying plastic material, or clay, and, in its preferred form, this means involves a container 10 carrying raw material, a duct 11 supplying water, a feed device 12 handling material from the contained, a mixer 13 in which material from the container is mixed with water from the duct, and power means 14 driving the mixer.

The container 10 is shown as a carrier suitable for handling finely divided or powdered raw material, preferably dry material, for making or working into clay, and it is shown as opening downwardly to the feed device 12. The duct 11 is shown as an ordinary water supply pipe, and it is provided at or close to its discharge end with a control valve 15 equipped with an electrical operating unit 16.

The mixer 13 is shown as involving a horizontally disposed upwardly opening chest 17 and a plurality of agitators 18 in the chest adapted to be rotated to effect intimate mixing of materials from the container 10 with water from the duct 11. In the particular case illustrated, the chest is elongate in form, and there are two agitators parallel with each other and extending longitudinally of the chest.

The feed device 12 is shown as a belt-type feeder that is motor driven. The feed belt 20 is shown supported by rollers 21 so that the belt extends beneath the discharge opening of the container, and a motor 22 is provided to operate one of the rollers so that the belt operates in a manner to carry material from the container to a point over the chest where the material discharges into the chest.

The power means 14 provided for operating the mixer is shown as including a motor 23 operating a drive shaft 24 through a suitable belt drive 25. The drive shaft 24 operates a drive head or gear box 26 through a clutch 27, the drive head being such as to include drive parts connecting the driven element of the clutch with the agitators 18 of the mixer. The clutch 27 may, in practice, be of any suitable form or type. However, where the machine is characterized by fluid pressure actuated units as hereinafter described, it is preferred that the clutch be this type, in which case it is under control of a power unit $f$ (Fig. 33) including a valve 30 operated by an electrical operating unit 31. In accordance with the present invention, the operating unit 16 controlling valve 15, the operating unit 31 controlling the clutch, and the circuit controlling motor 22 are related or interconnected as hereinafter explained so that these elements operate in unison, that is, so that they are either all on or all off as the operating condition requires. The control system is illustrated in Fig. 33 of the drawings.

A clay feeder B receives the clay formed in or by the mixer 13, and, in practice, it is preferably an auger type mechanism shown as involving a horizontally disposed tubular body 32 and a screw or auger type element 33 disposed in the body and driven by a shaft 34 projecting from the head 26 operated from motor 23 through the clutch 27. Through this construction, as the feeder operates, it advances clay horizontally, and since it is tied into or connected with the supply means through the head 26, it operates simultaneously with the mixer and is out of operation when the mixer is not operating.

It is to be understood that, in practice, the head 26 may be any suitable gear mechanism or drive head handling power from the driven element of the clutch 27 so that the agitators 18 and shaft 34 are driven at the desired speeds and in the desired directions, as circumstances require.

A primary forming device C is related to the clay feeder B to receive clay therefrom and to form it into an elongate annular body. The forming device C is in the nature of an extrusion die and, in the case illustrated, is characterized by a horizontally disposed female or shell section 35 (Fig. 11) and a male or core section 36 within the shell and suitably spaced therefrom.

The female section or shell of the primary former C is joined to or carried by the tubular body of the clay feeder to be at and project from the discharge end of the feeder, and it is formed to have a clay passing opening 37 of suitable size and shape. In the case illustrated, the female section has a tapered or funnel-like portion 38 that receives clay from the feeder and directs it into the passage 37 where pipe is being formed. As is here described, the opening 37 is round in cross section and is of the size desired for the exterior of the pipe body. In the preferred construction, a renewable or replaceable line 40 is provided in the female section defining the opening 37 so that this portion of the structure can be advantageously renewed or replaced as circumstances may require.

The core 36 of the forming device C is located centrally in the female section and, in the case illustrated, is carried by spaced webs 42 projecting inwardly at the delivery end of the feeder body, and a neck portion 43 projects from the supporting webs centrally of the structure and carries a core head 44, the exterior of which is within the opening 37 and cooperates with the wall of opening 37 to define the form, shape, and size of the extrusion that results from clay being forced through the forming device by the action of the feeder. In the particular case illustrated, the head 44 is round in cross section and is spaced from the wall of opening 37 to establish a pipe body having the desired wall thickness and having a round opening. Further, a replaceable sleeve 45 is shown on the head 44 so that this part of the structure can be readily removed or replaced, as circumstances may require.

The present invention provides a bell forming mold D operable to form a cup or bell on the leading end of the extrusion formed by the forming device C. In practice, this portion of the mechanism may be varied widely to provide a socket or bell of any desired form, shape, or type. In the drawings, I have shown merely a simple, conventional mold by which a common form of bell is established on the pipe.

The bell forming mold includes, generally, a female section or socket 50 and a male section or plug 51 that cooperates with the socket, a mounting structure and operable mechanism generally designated 52 that supports the plug for reciprocation, a lock means 53 that connects the socket and plug in engaged relationship, and a power means g (Figs. 3, 8, and 33) that operates the plug through or by means of the mounting means 52.

The socket 50 is shown as carried by and projecting from the female section 35 of the forming device C, and it has a horizontally opening socket 55 continuing from the opening 37 and in the form of a suitably shaped enlargement beyond and continuing from opening 37. The socket 55 is shaped and proportioned to form or establish the desired exterior on the bell formed on the end of the pipe.

The plug 51 is carried by the mounting means 52 so that it is concentric with the socket 50, and it is shaped and proportioned so that, when engaged with the socket, it forms a closure therefor and cooperates with the socket to form an opening or cavity that will establish a bell or socket on the pipe of the desired size and shape. In the case illustrated, the plug 51 has an inner end or plate portion 56 which is adapted to engage and seat against the outer end of the male section or core 44 of the forming device C. The plug has an outer end or flange portion 57 adapted to fit into the outer or mouth end of the socket 50 to form a closure for the socket. A middle or intermediate portion 58 connects the plate 56 and the flange 57, and its exterior portion 59 is formed or tapered to define the tapered interior of the socket formed on the pipe. The relationship of the socket and plug is illustrated in Fig. 11 of the drawings.

The mounting means 52 for plug 51 involves, generally, a mounting rod 60, supporting elements 61 carrying the rod 60 horizontally and for reciprocation in line with the mold socket 50, and a coupling mounting the plug on the end of the rod 60 that faces the plug and socket.

In the form of the invention illustrated in the drawings, the rod 60 is of substantial length and is mounted horizontally between supporting elements 61 so that it is concentric with the feeder B and forming device C and with the mold D. The rod 60 is shown (Fig. 4) as an elongate tubular element, rectangular in cross sectional configuration, and the supporting elements 61 are shown as rollers carried by a frame 63 so that they engage the rod 60 to maintain it in the desired horizontal, aligned position, at the same time supporting it so that it can be freely reciprocated relative to the socket 50.

Through the construction just described, the rod 60 is held against rotation. The coupling by which the plug 51 is mounted on the socket facing end of rod 60 provides for rotation of the plug relative to the rod. In the particular case illustrated, the coupling includes a base plate 64 fixed on the end of the rod 60 and a spindle 65 (Fig. 11) projecting from plate 64. A hub 66 is rotatably supported on the spindle, and arms 67 project from the hub and support the plug 51 through brackets 68.

The lock means 53 serves to releasably secure the plug engaged with the socket, as shown in Fig. 12 of the drawings. In the particular case illustrated, the lock means involves hooks 70 on the outer end of the socket 50, and extensions 71 of the arms 67 engageable with or under the hooks. An operating means for the hook structure is shown as involving a finger 72 projecting from or beyond one of the extensions 71 and engageable in a notched block 73 slidably carried in a suitable guideway 74 on the socket 50. The notch of block 73 faces out or toward the rod 60 so that the finger 72 can be moved into and out of the notched block through reciprocation of the rod 60. The normal or unactuated position of the notched block 73 is such as to receive the finger 72 in position where the extensions 71 of arm 67 are clear of but ready to enter the hooks 70. The block 73 is operable in the guideway 74 to shift the finger 72 and thereby operate extension 71 into engagement with the hooks 70.

A power means a (Figs. 8, 9, 12, and 33) is provided for operating the notched block 73 and is shown as involving a fluid pressure actuated mechanism including a cylinder 76, a piston 77 in the cylinder, and a rod 78 connected with the piston and to the block 73. A suitable valve 79 controls the action of the cylinder and piston mechanism just described and is operated by an electrical actuating unit 80.

The power means g provided for operating the plug 51 operates the plug through the rod 60, that is, the parts are related so that the rod 60 is reciprocated with consequent movement of the plug relative to the socket. In the case illustrated, the means g is shown as including a fluid pressure actuated structure in which there is a stationary cylinder 81, a piston 82 operating in the cylinder, and a rod 83 connecting the piston 82 and the rod 60. The operation of the fluid pressure actuated means just described is under control of a valve 86 subject to operation in opposite directions. The valve 86 is under control of electrical operating units 87 and 88. In accordance with the present invention, air is employed as the fluid for actuating the means g in order to gain the action hereinafter described, whereby the plug maintains pressure on the belled pipe as the body of the pipe is extruded.

In the preferred form of the invention, a snubbing means F is provided to check movement of the plug carrying rod 60 to stop or limit overtravel of the rod beyond a fully retracted position. The rod with the parts thereon is of substantial mass, and it has a considerable travel, with the result that, when it is moved away from the belled pipe to a fully retracted position, it may tend to overtravel. The snubber may be any suitable form of movement stopping or checking device that will stop travel of the rod 60 without causing it to bounce back. In the case illustrated, the snubber, as shown in Fig. 5, involves a stop pin 90 positioned to be engaged by the rod 60 when the rod has moved beyond its fully retracted position. The pin 90 is, in effect, a plunger operating in a cylinder 91 carrying liquid, and suitable fluid connections 92 connect the cylinder with a liquid carrying reservoir 93 where a suitable head pressure is maintained on the supply of liquid by air delivered through a supply pipe 94. When the rod 60 strikes the pin 90, the pin is depressed into the cylinder 91, forcing liquid therefrom and into the reservoir, and when the rod 60 is moved away from the pin 90, the air pressure on the liquid in the reservoir re-establishes the pin 90 in an unactuated position ready for a subsequent operation.

A pipe cutting means J (Fig. 11) is provided to cut a fully formed or completely extruded pipe body from the extrusion issuing from the primary forming device C when the desired pipe body has been formed. In accordance with the present invention, the pipe cutting means J is characterized by a cutter located in the socket 50, and it is a rotating device reversible as to direction of rotation and serving to cut when rotated in one direction, and to be retracted when rotated in the opposite direction.

In the form illustrated in the drawings, the cutter that is located in the socket 50 involves a head 95 mounted on a shaft 96 concentric with the socket. A reversible drive is provided for operating the shaft 96 and is shown as involving a reversible motor 97 and an operating connection from the motor to shaft 96. The motor 97 is preferably external of the clay handling parts, and in the arrangement illustrated, the operating connection between the motor 97 and the shaft 96 involves a shaft 98 driven by the motor 97 and extending into a housing 99 supported by the ribs 42 that carry the stem 43. The shaft 96 is rotatably supported in the structure formed by parts 43 and 44, and it extends into the housing 99 where it is connected with shaft 98 through a gear drive 100.

The cutter includes a blade 101 carried by the head 95 through a pivot pin 102, the blade being so mounted as to be movable between a retracted position such as is shown in Fig. 10 where it will clear the interior of the pipe extruded by the means C, and an operating position where it projects from the head 95 far enough to cut completely through the wall of the extrusion. In the case illustrated, an operating means for the blade 101 includes an actuator or plate 103 pivotally connected with the head 95, for instance, pivotally supported on the shaft 96 adjacent the head 95, and fingers 104 on the actuator spaced apart and having the blade 101 engaged between them. Drag members or friction shoes 105 are provided on the actuator 103 and are arranged to engage in the opening 106 occurring in the core portion 36 of the plug 51 located in socket 50.

The shoes 105 resist rotation of the actuator in the plug, and as a result, when the cutter is rotated in one direction or as indicated by the arrow in Fig. 10, the actuator assumes a position relative to the head 95 where the blade 101 is retracted. When the shaft is rotated in the opposite direction, the actuator and head assume a position where the blade 101 operating between the fingers 104 projects a substantial distance outwardly and far enough outwardly to cut completely through the extrusion. It is preferred, in practice, that a stop means be provided to limit the relative rotation between the head and actuator. In the drawings, a stop pin 110 is shown provided on the actuator 103 operating in a slot 111 provided in the head 95.

From the foregoing description, it will be understood that, when the rod 60 is operated to a position such as is shown in Fig. 11 and the lock means is then actuated to lock or to unlock the plug 51 engaged with the socket 50, a limited amount of rotation occurs between the plug and the socket. It is highly desirable, in practice, that the clay body forming the pipe and the bell on the pipe be free of undesirable torque or strains such as might result from excessive drag caused by this rotation of the plug during the unlocking operation. In accordance with the present invention, a lubricating means E is provided and serves to supply the elements of means D with fluid or lubricant.

In the case illustrated, a spray nozzle 112 is provided at or within the plug 51 and may be supplied with suitable fluid through a passageway or duct 113 within the structure supporting the plug. The desired fluid is supplied to the duct 113 through a flexible supply line 114 and is under control of a valve 115 operated by a cam actuator 116 (see Fig. 8) so that, as the rod 60 is operated causing the plug 51 to approach the socket 50, a suitable amount of liquid is sprayed into the socket and, consequently, lubricates the plug and socket in the desired manner. The cam actuator is such that there is but momentary opening of the valve 115, and the valve is closed when the plug 51 reaches the working position in connection with the socket.

The valve 86 controlling the action of means g is so operated by the electrical operating units 87 and 88 that the rod 60 is initially advanced or moved into a position where the plug 51 engages the socket 50, as shown in Fig. 11 of the drawings. Following the forcing of material into the mold D to form the bell of the pipe, the lock 53 is released, freeing the plug 51 from the socket 50 and leaving only pressure in the means g to hold the plug in the socket and to resist movement of the plug away from the socket. This resistance to movement of the plug 51, created by the means g, is maintained as extrusion of the body occurs, and as a result of this, as the pipe body is formed and the bell of the pipe leaves the socket and moves away from the socket, pressure is maintained on the pipe or on the extrusion lengthwise thereof, preventing collapse or sagging thereof. The control provided by the invention is such that this pressure is maintained on the extruded pipe until such time as a suitable support is provided for the pipe, making such end pressure no longer necessary, whereupon the valve 86 in the power means g reverses so that the rod 60 is retracted to carry the plug away from the pipe.

A pipe supporting means H is provided for engaging the pipe, preferably beneath the same and against the body portion of the pipe, rather than against the belled end portion thereof. The supporting means operates to engage and support the pipe while the pipe is maintained under longitudinal pressure or compression and before the cutter has operated to sever the pipe from the extrusion issuing from the means C.

The means H is characterized by a cradle 117 engageable under the pipe and by a mounting or supporting means carrying the cradle for vertical movement into and out of position where it engages beneath the extruded pipe prior to the pipe being cut, and a power means i (Figs. 14, 15 and 33) is provided for operating the supporting means. The cradle 117 is shown as an elongate trough-like element sufficiently long so that it will engage beneath a substantial portion of the pipe body, and its contour is preferably such as to correspond to the exterior of the pipe body.

Considered generally, the means carrying the cradle 117 is a pivotal support or mounting, and in the drawings, it is shown as involving fixed vertical standards 120 (Fig. 17) carrying a horizontal pivot 121 that supports a rocker 122. The rocker has an upwardly projecting portion above the pivot 121 carrying swingable arms 123 which are operable to a position where they project laterally from the rocker. The arms have the cradle 117 mounted on them. The combined structure formed by the rocker 122 and arms 123, when the parts are positioned as shown in Fig. 14, is substantially L-shaped, with the rocker extending vertically and the arms 123 extending horizontally. In the preferred construction, the cradle is mounted on the outer ends of the arms through a head 159 on which the cradle is pivoted and to which the arms are connected.

The power means i, provided for operating the mounting means of the cradle, is preferably a fluid pressure actuated mechanism and is shown as involving a pivotally supported cylinder 130, a piston 131 operating in the cylinder, and a rod 132 carried by the piston and pivotally connected at 133 to the depending portion or arm of the rocker 122.

The parts just described are best shown in Fig. 14 of the drawings, and when the piston 133 is in an advanced position, as indicated in this figure of the drawings, the rocker 122 is substantially vertical, the arms 123 are substantially horizontal, and the cradle 117 is in pipe supporting position. When the piston 131 is moved to the other end of the cylinder, the depending arm of the rocker is moved toward the cylinder 130, and the arms 123 are moved or swung down so that the cradle 117 is below the pipe to be spaced therefrom and clear of both the body of the pipe and the bell that occurs on the pipe. The cylinder and piston mechanism just described is under control of a valve 138 operated by an electrical operating unit 139.

A cradle shifting means K is provided and serves to shift the cradle 117 horizontally while it is maintained in the elevated or pipe supporting position such as is shown in Fig. 14. In the preferred construction, the arms 123 are like parallel members having fixed ends pivoted on the upper end of the rocker 122 by pivot members 140, and they have their outer ends pivoted to the under side of the cradle carrying head 159 by pivot pins 141. Through this construction, the cradle is supported from the rocker through the arms 123 so that, by shifting or pivoting the arms, the cradle is swung in the direction indicated by the arrow X in Fig. 15.

The means *h* for shifting the cradle is shown (Figs. 14, 15 and 33) as involving a fluid pressure actuated mechanism having a cylinder 142, a piston 143 in the cylinder, and a rod 144 operated by the piston and suitably coupled with the arms 123. In the case illustrated, the pivot members 140 are rotatably supported by the rocker, the arms 123 are fixed to the pivot members 140, and the rod 144 is coupled to the pivot members 140 by lever arms 146 projecting from the members 140. A connecting rod 147 extends between the lever arms while a link 148 is pivotally connected with the rod 147 and with the rod 144. The particular construction illustrated involves a horizontal beam 150 at the upper end of the rocker 122, and the pivot members 140 are rotatably carried by the beam. An extension 150*a* of the beam has a bracket 151 at its outer end to which the cylinder 142 is pivotally connected.

Through the construction just described and best shown in Figs. 14 and 15 of the drawings, the fluid pressure operating mechannsm *h* serves to swing or operate the arms between the extended position shown in Fig. 15, where the cradle is beneath the initially formed pipe, and a retracted or folded position where the arms are substantially parallel with and overlie the beam 150, in which latter case the cradle has been moved in an arc away from the socket in the direction that the socket opens or faces and laterally from the axis of the socket to a position laterally offset horizontally from the axis of the structure serving to form the pipe. The operation of the fluid pressure mechanism formed by cylinder 142 and piston 143 is under control of a valve 155 actuated by an electrical actuating unit 156.

A pipe finishing means L (Figs. 14, 15, and 16) is provided to receive the pipe from the cradle hereinabove described, and a transfer means M (Figs. 14 and 17) is provided for operating the cradle so that the pipe carried thereby or resting therein is delivered therefrom to the finishing means L.

The transfer means M involves a pivotal mounting of the cradle and a power means *j* (Figs. 14, 17, and 33) for rocking or tilting the cradle when the cradle has been moved to a position where the pipe will be received by the finishing means upon being discharged from the cradle. In the construction illustrated, the cradle 117 is mounted on head 159 by pivots 157 supported by brackets 158 on head 159. When the cradle 117 is in the position shown in Fig. 14, it is not only pivoted to but also rests on and is supported by the head 159.

The power means *j* of the transfer means M is preferably a fluid pressure actuated mechanism serving to rock or tilt the cradle about its pivotal mounting 157 to a position such as is shown in Fig. 30, and to such extent that the pipe in the cradle will discharge or roll therefrom to the finishing mechanism or means L by the action of gravity. The power means for rocking the cradle 117 is shown as including a cylinder 160, a piston 161 in the cylinder 160, and a rod 162 operated by the piston 161 and connected to the cradle by a pivot 163. The cylinder 161 is carried by or fixed to the head 159 and depends therefrom, and the rod 162 projects upwardly and pivotally connects to the cradle so that, when the piston 161 moves upwardly in the cylinder 160, the cradle is swung or rocked about the pivot 157. A valve 165 controls the operation of the fluid pressure actuated mechanism that rocks the cradle, and an electrical actuating unit 166 is provided for operating the valve 165.

The pipe finishing means L, best shown generally in Figs. 14 and 16 of the drawings, involves, generally, a frame with a central base section 170 and end sections 171 and 172. A pipe receiving seat 173 is carried by the central section 170, while a mechanism for finishing the bell end of the pipe is carried by section 172, and a mechanism for finishing the spigot end of the pipe is carried by the section 171.

The seat 173 of the means L is carried by a mounting 176, and the mounting 176 is supported for movement between a pipe receiving position and a pipe discharging position. The seat 173 is an elongate concave element corresponding generally in size and shape with the cradle 117, and it is connected to the mounting 176 through a pivotal connection 177 so the seat is shiftable between an up position such as is shown in Fig. 14 and a down position such as is shown in Fig. 30 where the seat is so disposed as to effectively maintain a pipe therein in line with the mechanisms provided for trimming the ends of the pipe. When the mounting 176 is in the pipe receiving position shown in Fig. 14, it is engaged on a standard or rest 178.

Means is provided for normally yieldingly maintaining the seat 173 in an up or elevated position such as is shown in Fig. 14, and in the case illustrated, this means involves a cylinder 180, a piston 181 in the cylinder 180, and a rod 182 extending from the piston and coupled to the seat by a pivot pin 184. The cylinder is pivotally anchored at 185, and fluid, such as air, is supplied at a suitable pressure to the lower end of the cylinder through a supply duct 186. The pressure maintained in the lower end of cylinder 180 is such as to normally hold the seat elevated. However, when a pipe from the cradle is discharged onto the seat, the pressure thus applied to the seat is such as to depress the seat and cause the piston 181 to move down in the cylinder until the seat reaches its down position, where it rests solidly on the mounting 176.

The mounting 176 that pivotally carries the seat 173 is carried by a pair of arms 190 pivotally connected to brackets 191 by horizontal pivot pins 192. The axis of the pivot pins 192 is located so that, when the arms 190 are swung in the direction indicated by the arrow Y in Fig. 14, the mounting 176, carrying the seat 173 with it, is swung from the normal working position shown in Fig. 14 to a discharge position where the seat discharges a pipe thereon into a turning and positioning mechanism P. The position of the seat as it discharges the pipe into the mechanism P is illustrated in Fig. 31 of the drawings.

A power means *b*, preferably a fluid pressure actuated means (Figs. 14, 15, 16, and 33), is provided for operating the arms 190, and in the case illustrated, this means includes a cylinder 195, a piston 196 operating in cylinder 195, and a rod 197 extending from the piston 196 and connected to the arms 190 by a pivot 199. The cylinder 196 is pivotally anchored at 200. A valve 201 controls the operation of the mechanism just described, and an electrical actuating unit 202 operates valve 201.

The finishing mechanisms provided to act upon (for instance, to trim and score) the ends of the pipe while it is resting in the seat 173 are in line with each other and are mounted to reciprocate horizontally into and out of engagement with the pipe held by the seat. In the case of the finishing mechanism provided to operate upon the spigot end of the pipe (Figs. 16 and 22–24), there is a carriage 210 on guides or tracks 211 that extend parallel with the seat 173. A carrier 212 is supported by the carriage through a suitable ring bearing construction 213 through which the carrier is mounted to rotate about the axis of the pipe located on the seat 173.

A suitable power means is provided to normally rotate the carrier at a suitable speed, and in the case illustrated, this involves a fluid operated motor 214 connected to the carrier through a suitable general drive 215.

A stop 217 is carried by the carrier to rotate relative thereto on an axis coincidental with that of the carrier and of the pipe on the seat 173. The stop has a face 218 engageable with the spigot end of the pipe. A yielding means such as a spring 219 normally yieldingly holds the stop 217 in a given rotative position relative to the carrier.

Cutting or trimming blades 220 and 221 are carried by the stop 217 and project therefrom to engage and trim the corners that occur at the spigot end of the pipe. The engagement of the cutters with the pipe and the friction established between the end of the pipe and the face 218, when the end of the pipe engages the face 218, result in movement of the stop relative to the carrier against the resistance of spring 219.

A groove former, such as a roller 225 having scoring ridges or teeth 226 thereon, is supported in a radial guideway 227 in the carrier, and it is coupled to the stop 217 by an operating link 228 so that, when the stop moves relative to the carrier against the resistance of spring 219, the roller 225 moves radially inward causing the teeth 226 to engage the exterior of the pipe adjacent the end thereof. The operating link is pivoted to the stop 217 by a pivot pin 230, and projections 231 on the stop engage the link and limit movement of the stop relative to the link in the desired manner to cause the desired radial shifting of the roller. The roller is on a spindle 233 that projects from the outer end of the operating link and operates in the radial guideway 227.

The mechanism that trims and scores the bell or socket end of the pipe may be similar, generally, to that just described. In the case illustrated (Figs. 16, 18, and 19), it involves a carriage 240 supported by a guide or track 241 which is parallel with the track 211 and, therefore, parallel with the seat 173. A carrier 242 is rotatably supported from the carriage through a ring bearing 243. A stop 244 is rotatably carried by the carrier 242 and carries one or more blades 245 located and formed to trim the corners in the socket end of the pipe. A spring 246 normally yieldingly holds the stop in a given rotative position relative to the carrier 242.

A scoring member or roller 247 is arranged so that its teeth or scoring parts 248 will engage the interior of the socket when the roller is moved radially outward. The roller is carried by a spindle 249 that operates in a circumferential guideway 250 in the carrier, and an operating link 251 is pivoted to the carrier at 260 and carries the spindle 249. Projections 261 on the carrier engages the operating link 251 and limit movement of the stop relative to the link. When the stop moves relative to the carrier due to friction of the stop against the bottom of the socket, or due to the action of the cutters, the scoring roller 247 is moved radially outward so that its teeth engage and score the interior of the socket or bell on the end of the pipe. In the mechanism operating on the belled end of the pipe, as in the mechanism that operates on the spigot end of the pipe, the carriage is normally rotated as by a motor 272 operating through a suitable drive 273.

Suitable power means $k, k$ (Figs. 16, 22, and 33) are respectively provided for shifting the carriages 210 and 240 into and out of engagement with the pipe. The carriage 210 is shown as being shifted by a cylinder and piston mechanism 235 connected to the carriage by an operating rod 236. The carriage 240 is shown as being shifted by a cylinder and piston mechanism 270. The cylinder and piston mechanism 235 and 270 are controlled by a valve 271 under control of an electrical operating unit 237. The units 210 and 270 operate simultaneously under control of the valve 271.

The turning and positioning mechanism P is located beside the finishing means L and is so located as to receive pipe that discharges by gravity or rolls from the seat 173 as this seat is moved to the discharge position, as hereinabove described. The mechanism P involves a pipe gripping means 275, and in the form illustrated, this means involves a main jaw 276 and a clamp jaw 277.

The main jaw 276 is an elongate concave element, horizontally disposed when in the pipe receiving position, and when in that position, it extends parallel with the seat 173 of the trimming means hereinabove described. The clamp jaw 277 is adapted to move or shift relative to the main jaw, and in the case illustrated, it is pivotally mounted, being carried by a pivot 278 so that it is movable between an open position such as is shown in Fig. 14, where it in no way obstructs passage of pipe into or out of the main jaw, and a closed position such as is shown in Fig. 20, where it cooperates with the main jaw to form a grip that engages a substantial distance around a pipe placed on the main jaw. The jaws 276 and 277 are preferably lined with a layer of felt, or the like, that will frictionally engage the pipe so that the pipe will not slip in the jaws. When the pipe is thus gripped, it is effectively and dependably maintained on or in engagement with the main jaw.

In the preferred construction, the clamp jaw is an elongate concave element which, like the main jaw, is shaped to conform to the exterior of the pipe, and the clamp jaw may, in practice, be substantially coextensive with the main jaw which is preferably about the length of the body of the pipe and, therefore, is about the same length as the seat 173 and the cradle 117.

A power means $c$ is provided, as shown in Fig. 14, for operating the clamp jaw 277 and is shown as involving a cylinder 280, a piston 281 operating in the cylinder, and a rod 282 from the cylinder to the jaw 277. The rod is pivotally connected to the jaw 277 by a pivot 283, and the cylinder 280 is pivotally carried by a pivot pin 285. The power mechanism just described is under control of a valve 286 operated by an electric actuating unit 287.

In the arrangement illustrated, the operating element for the valve 286 is under control of a switch 288 operated by a pivoted trigger 289. The trigger has a part located adjacent the main jaw 276 to normally project into the path of pipe being engaged with the jaw 276 so that, as a pipe enters the jaw 276, the trigger 289 is operated, actuating switch 288 so that unit 287 is operated positioning the valve 286 so that the power means is actuated to close the clamp jaw 277. A second switch 290 is in the circuit controlling the actuating unit 287 and is so positioned as to be engaged and operated by the carrier that supports the main jaw 276, so that, when the gripping means has been moved from the horizontal position shown in Fig. 14 to a vertical position such as is indicated in Fig. 32, the circuit to the unit 287 is operated, positioning the valve 286 so that the power means opens the clamp jaw 277.

In accordance with the invention, a carrier 291 supports the pipe gripping means just described so that it is operable between a pipe receiving position, where it is horizontally disposed as shown in Figs. 14 and 20, and a pipe delivering position, where it is vertically disposed as indicated in Fig. 32. In the preferred form of the invention, the carrier 291 is fixed to the gripping means and is connected to a stationary bracket 292 by a horizontal pivot pin 293. The carrier projects from the gripping means so that it extends down from the elongate jaw mechanism at one end thereof, in fact, at the end of the jaw mechanism or gripping means which is lowermost when the gripping means is vertically disposed. A rest 294 is provided to receive and support the other, or what is the upper, end of the gripping means when it is vertically disposed, when the gripping means is in the horizontal or pipe receiving position as shown in Fig. 20.

A power means $d$ (Figs. 14, 20, and 33) is provided for operating the carriage 291 so that the pipe gripping means is shifted between the horizontal and vertical positions, and in the case illustrated, the power means involves a cylinder 295, a piston 296 operating in the cylinder, and a rod 297 projecting from the piston and connected to the carrier 291 by a pivot 298. The cylinder 295 is pivotally supported by means of a pivot pin 299. The power means just described is under control of a valve 300 operated by an electrical actuating unit 301. The operating circuit for the unit 301 is under control of a switch 302 located at the pipe gripping means adjacent the point where the jaws are pivotally connected so that this switch is operated when the gripping jaw reaches closed or pipe-gripping position, with the result that, upon the gripping means being closed, the valve 300 is positioned to put the power operating means *d* for the carriage 291 in operation, with the further result that the carriage is then swung to move the gripping means from the horizontal pipe receiving position to the vertical pipe discharging position.

A pipe handling means R (Fig. 21) receives the pipe in the vertical position from the mechanism P and is, in effect, a mechanism that handles a series of individual pipe-carrying pallets 310 so that they are successively moved into position to receive pipe units from the mechanism P and, when loaded, are moved out of that position for movement to and final deposit at a position where the pipe can be left to dry. In the case illustrated, the means R involves a horizontal support 312 in fixed position in line with and below the pipe gripping means of mechanism P when that means is vertically disposed. The support 312 is adapted to receive a pallet 310, and a reciprocating pusher 311 is adapted to advance the pallet to pipe receiving position and to further advance it by means of a second pallet to a conveyor 313.

The pusher 311 is supported by a guide structure 314 so that it reciprocates horizontally between a position where it is exposed to receive a pallet 310 and a position where it has moved that pallet toward the conveyor 313. The pusher 311 is adapted to be reciprocated or operated by suitable power means *e* shown in Fig. 21 of the drawings as involving a cylinder 315, a piston 316 operating in the cylinder 315, and a rod 317 extending from the piston 316 and connected to the pusher. The power means just described is under control of a valve 318 adapted to be operated by an electrical actuating unit 319.

The pallet conveying device is preferably a horizontally disposed conveyor or pallet receiver 313, located so that a pallet that has been positioned on the support 312 to receive a pipe from the mechanism P is pushed from the support 312 onto the conveyor 313 as a succeeding operation of the pusher 311 pushes the next pallet into position on the support 312. In the case illustrated the conveyor 313 is shown as involving a series of rollers 320 in a suitable frame 321. In practice the conveyor can be of any suitable construction and can be extended as circumstances require. Ordinarily, the conveyor is of such length and is so disposed to receive and handle pallets discharged by the machine in such manner as to enable workmen servicing the machine to receive the pallets and finally deposit them where the pipe is to be left for drying.

The control means or control system provided by the present invention interconnects the several principal means, mechanisms, or elements hereinabove described, to the end that they operate, not only in the desired timed relation, but in the desired manner, so that the machine as a whole operates rapidly, accurately, and wholly without manual operations or care from the time the original raw materials enter the machine until the finished, vertically disposed pipe units are discharged at the conveyor. In considering the invention it is significant to observe that the forming device C establishes a horizontally disposed extrusion, and the material thus extruded is maintained horizontally disposed, is worked upon, shifted, and manipulated generally while it is maintained horizontally disposed, and it is maintained in or close to a single horizontal plane and also in close proximity to the axis of the initial extrusion until it is finally moved from the horizontal position to a vertical position for final deposit on a pallet. The relationship of parts giving the machine these general characteristics makes possible high speed production or operation in the manufacture of pipe units of substantial size and bulk, since the machine as a whole is without any operations or actions which involve extended, complicated, or exceedingly rapid movements of the formed material.

An important feature or aspect of the control means that is provided by the present invention is the incorporation in the machine of two separate and distinct fluid pressure systems, one of which gives positive or solid action while the other gives a soft or cushion action. In carrying out the invention, certain of the fluid pressure actuated units or means incorporated in the machine are operated by liquid, and the action of these units is, in effect, solid or positive. Other fluid pressure actuated means or units in the machine are operated pneumatically, and the action of these parts is, in effect, soft or cushioned.

Further, in accordance with the present invention, it is generally characteristic of each of the fluid pressure actuated power means in the machine that it be under control of a valve and that the valve be actuated by an electrical operating unit, which unit is, in turn, coupled or connected in an electrical system or circuit characterized by control switches and relays, the switches being coordinated with the working or mechanical parts of the machine, to the end that the desired time relationship between the parts is gained.

The control means or system is diagrammatically illustrated in Fig. 33, where a pump 350 is illustrated delivering liquid under pressure to a supply line 351. A liquid return line 352 is provided and delivers the liquid exhausted from the valves to a reservoir 353 from which the pump 350 is supplied. In accordance with the present invention, the power means *a* operating the lock mechanism 53, the power means *b* operating the seat mounting means 190, the power means *c* operating the gripping means of mechanism P, the power means *d* operating the carriage 291, and the power means *e* operating the pusher are all supplied with operating fluid under pressure by the supply line 351 and are under control of valves 79, 201, 286, 300, and 318, respectively.

An air supply line 360 is provided and is supplied with air under pressure from a tank or reservoir 361, which is shown as supplied by means of a suitable pump 362. Power means *f* operating clutch 27, power means *g* operating the rod 60, power means *h* operating the arms 123, the power means *i* operating the rocker 122, power means *j* operating the cradle 117, and power means *k* operating the trimming mechanisms are all supplied with air under pressure from the pressure supply line 360 through valves 30, 86, 155, 138, 165, and 271, respectively.

The electrical system provided by the present invention includes, not only the electrical valve actuating units hereinabove mentioned and the switches that have been mentioned, but also various additional switches and holding devices or relays and interconnections between various elements, as appears from the diagram, Fig. 33.

In the diagram, Fig. 33, electrical power carried by lines 365 acts through a master unit 366 to energize the control circuit, one pole of which is carried by a main bus line 367 while the other pole is carried by a main bus line 368. For simplicity of illustration, the various electrical elements are illustrated as coupled between the bus lines 367 and 368.

Certain of the elements of the machine, in practice, require manual control at times, and for such purpose, suitable manual switches are provided as at 575 and 576, whereas under normal operating conditions they, together with all of the the other elements, are under full automatic electrical control. In the system illustrated, the electrical elements requiring occasional manual operation are normally connected with a branch bus line 367ᵃ through a selector switch 370 which can be thrown to disconnect the branch bus line 367ª and to energize a branch bus line 367ᵇ supplying the switches at 575 and 576. During normal operation of the machine, the selector switch 370 is positioned as indicated in the diagram, and as a result of such setting, the control circuit to the various elements of the machine is in service.

A primary starter switch 390 controls a circuit through line 391 to the actuating element 80 of valve 79 controlling power means $a$ that operates the lock means 53 for locking the plug 51 in engaged position with the socket 50. In the construction illustrated, the starter switch 390 is supported on a beam 376 spaced from and extending parallel with the rod 60, and a cam 377 on the rod 60 is located lengthwise of the rod and is related to the switch 390 so that the switch 390 is operated or closed to line 391 as the rod 60 reaches the position where the plug 51 engages the socket 50. The switch 390 is a double throw switch and is such as to be operated or closed to line 391 only as the cam 377 moves toward the socket 50.

A manually operated master control switch 390ª is provided, ahead of and in series with the switch 390, for putting the machine into operation and for stopping it when desired. Opening of switch 390ª will stop operation of the machine with the rod 60 advanced and with the plug in the socket, but not locked therein. It is to be noted that operation of the lock 53 will cause closing of a switch 371, which starts a new cycle of operation of the rod 60 and the elements of the machine related thereto, all of which will be hereinafter described.

A timer 392 is provided in the circuit controlling the lock means; for instance, it may be connected in line 391 and, in practice, is an adjustable timer. The timer operates so that, following closing of switch 390, the circuit to the operating unit 80 controlling the lock means remains energized, and the lock remains closed or engaged for a predetermined time interval, following which the timer releases, the circuit opens, and the lock means is released by reversal of operation of the power means $a$.

The control circuit for motor 22 is controlled by a starter switch 371. The switch 371 is located on the lock means 53 so that it is operated or closed upon the lock means 53 being engaged to lock the plug in the socket. The closing of switch 371 closes a self-energizing relay 372, which in turn closes a relay 374. Closing or energization of relay 374 through a line 373 closes a switch 380, which completes the circuit to the switch 375 in the power line 365ª to motor 22.

The relay 374 includes the switch 380 governing the circuit to motor 22, and it also includes a switch 381 governing the circuit to an electrical actuator 31 operating the valve 30 of the power means $f$ of clutch 27. As a result of this connection, when the relay 374 is energized, clutch 27 is closed.

The relay 374 further includes a switch 383 governing the circuit to the electrical actuator 16 operating valve 15, which controls the flow of water to the mixer.

As a result of the switches and connections just described, closing of the starter switch 371 causes simultaneous operation of the material feed device A, the clutch 27, and the water supply 11.

The relay 372 is shown as including a coil or winding 397 energized by the momentary closing of switch 371. The winding 397 is maintained energized through a switch 398 in the relay closed when winding 397 is initially energized. The switch 398 is in a holding circuit carried by a line 399 in which there is a stop switch 400 hereinafter described.

As the control thus far described is set into operation, as stated, the mixer is being supplied with material from the container 10, water is being supplied to the mixer, the agitators of the mixer are in operation, the initial forming means B is in operation delivering material or clay to the forming device C, and, since the plug is in the socket of the mold, the material thus delivered is filled into the cavity established by the socket and plug forming a pipe socket or bell.

The timer maintains the lock means engaged long enough so that the mold fills completely with clay, at which time the lock means 53 releases, freeing the plug from the socket.

Continued operation under the conditions above stated results in a straight tubular extrusion issuing from the forming device C, and, as this extrusion is formed or as this action continues, the belled clay formed while the plug was locked in the socket moves out of the socket and continues to advance away from the socket, pushing the plug and the rod 60 supporting the plug. This pushing of the plug and its supporting rod occurs against the resistance of air under pressure in the means $g$ that operates the rod, the means $g$ being such as to maintain a substantial pressure against this movement of the extrusion, with the result that the extruded clay is maintained under pressure and, therefore, straight and tubular until the desired length of extrusion has been obtained and the cutting and supporting operations have been performed, as hereinafter described.

The pressure exerted by the means $g$ is, in effect, compression on the extrusion counteracting the action of gravity that tends to cause sagging deflection, collapse, or even, possibly, breaking off of the extrusion because of its extension beyond the point of support where it issues from the forming device C.

The operation of the rod 60 under the action of the power means $g$ is under control of a series of switches, including switches 401, 402 and 400. These switches are double-throw switches and are operated by the cams on the rod 60, the several switches being located on the beam 376. The various switches on beam 376 are adjustable lengthwise of the beam so that accurate adjustment of the machine can be made easily and quickly.

The switch 401 is located on the beam 376 remote from the plug carrying end of rod 60, and, if it is assumed that the rod has moved to a fully retracted position, it will operate switch 401 to one position for closing a circuit through line 405 and causing energization of relay 406 by completing a circuit through the holding coil 407 of that relay. Operation of relay 406 closes switch 408 of relay 406, thus completing a circuit through line 409 to the actuating unit 88 that operates valve 86 to a position that results in operation of the means $g$ so that the rod 60 is moved toward the socket of the mold. Thus operation continues, as relay 406 is held closed, until the plug 51 approaches the socket 50 but is still spaced an appreciable distance therefrom, at which time switch 402 is operated by cam 415 on the rod 60, thus opening the circuit through the holding coil 407 of relay 406 so that switch 408 is opened and the operating unit 88 is thus de-energized. The rod and the plug thereon being in motion, they will continue in motion until the plug reaches the socket 50, whereupon they stop with the plug in working engagement with the socket, and the lock means 53 operates through the control hereinabove described. Operation of switch 371, occurring at this time, closes relay 372, and in this relay there is a switch 418 controlling a circuit normally closed by switch 390. The circuit controlled by switch 418 is carried through a line 419 which connects with line 409, with the result that a circuit is complete to the actuating unit 88 of valve 86 so that pressure is again introduced into the means $g$, causing the rod and the plug thereon to be held with pressure against or toward the socket 50.

The pressure thus established on the plug urging it toward the socket is maintained while the body of the pipe is extruded, after the plug has been unlocked, and as the plug in the belled end of the pipe moves away from the socket. This condition continues or prevails until the desired amount of pipe body has been extruded, at which time switch 400 is operated to release relay 372, thus opening the circuit through line 419 to the actuating unit 88 of valve 86. As the relay 372 is opened, switch 398 is opened, and as a result, the switches 380, 381, and 383 are opened, stopping operation of motor 22, the flow of water, and the operation of the mixer.

The operation of switch 400, as just described, closes the circuit through line 410 to relay 411 so that the holding coil 412 of relay 411 is energized and switch 413 of relay 411 is closed. This completes a circuit through line 414 to the operating unit 87 of valve 86, causing valve 86 to be reversed so that pressure is supplied to the means g for causing the rod to be moved away from the socket or to be retracted, which operation results in withdrawal of the plug from the bell or socket of the pipe.

The retracting movement or operation of rod 60 under the action of the means g continues until cam 377 operates switch 401, which operation causes relay 411 to be opened or dropped with consequent opening of switch 413 and, therefore, opening of the circuit through line 414 to the actuating unit 87. Simultaneous with this opening of the circuit to operating unit 87 the circuit to the operating unit 88 through the line 409 is closed through the relay 406, which operation occurs as a result of operation of switch 401. The cycle of operation of the rod 60 is thus completed, and a second cycle started.

Operation of switch 400 results in stopping of the various operations identified with that switch and in closing of the circuit through the line 410 to the relay 411 actuating relay 411, so that switch 420 in relay 411 is closed, this switch being in a circuit carried by a line 421 which connects to the motor 97 that operates the cutter J. A switch 422 is in series in the line 421 and is operated by a cam 415 after the cradle is lifted into supporting engagement with the pipe and after the rod is operated to retract the plug from the socket. Rotation of the cutter head acts to sever the formed pipe. The closing of the circuit to motor 97 causes that motor to operate in a direction to actuate the cutter so that the extruded pipe, with the socket or bell on the leading end thereof, is severed from the material or clay at the discharge end of the forming device C.

The operation of the motor 97 driving the cutter for cutting the extruded pipe body continues under power while the elongate cam 415 holds the switch 422 actuated. When this operation of the motor 97 is cut off, the cutter will continue to spin and will slow down or decrease in speed until the rod operates toward the socket, causing the plug to approach the socket, and until cam 415 on the rod operates switch 402, whereupon a circuit is closed through line 425, which line leads to the other pole of the reversible motor 97, with the result that the motor 97 operates in a direction opposite to that above described, with consequent retraction of the blade of the cutter so that the cutter is fully collapsed before the plug engages the socket and before the feeder B is again put into operation to cause material to be extruded into the mold. The timed operation of switch 402 results in the desired retraction of the cutter blade, following which the circuit through line 425 is opened, but the cutter continues to spin or revolve, maintaining the blade retracted, and it slows down or decreases in speed until the motor is energized as first described and in a manner to again cause the blade to be extended for cutting.

When the switch 400 is operated to cause stopping of operations, so that the extrusion of clay is stopped, with the desired length of pipe extruded and held under pressure by the means g acting through the rod and plug, a circuit is completed through the line 410 and through a line 430 to a relay 431, which relay is closed at this time so that switch 432 of the relay in line 430 is closed, thus completing a circuit to relay 433 so that this relay is energized, closing switch 434 thereof and completing the circuit through a line 435 to the actuating unit 139 of valve 138, causing operation of the power means i so that the rocker 122 is operated to its vertical position from its phantom outline position shown in Fig. 14. The cradle 117, carried by the rocker 122 through the arms 123, is thereby elevated and finally positioned under and in engagement with the body portion of the pipe. This action occurs before operation of switch 422 by cam 415, which causes cutting of the pipe, so that the cradle supports the pipe before it is severed from the material at the discharge end of the forming device C.

When the cutter has been operated as above described to sever the formed pipe, so that it is free, switch 445 is operated opening the circuit to relay 431 so that switch 442 of relay 431 is opened, opening a circuit through line 446 which supplies the actuating unit 156 for valve 155. This results in the valve 155 operating, as by means of a spring or the like (not shown) incorporated therein, to cause operation of means h so that the arms 123 carrying the cradle 117 are operated from the position shown in Fig. 14, where the cradle supports the pipe in line with the mold D and forming device C, to swing the pipe in the direction shown by the arrow X in Fig. 15, with consequent carriage of the pipe laterally from alignment with the mold while it is maintained in a horizontal plane, the movement being such as to move the pipe out of the path of the next pipe to be formed and out of the path of the rod and the plug carried thereby, thus clearing the mechanism for return of the plug to the socket in the manner hereinabove described.

A switch 452 is provided in line 409 from relay 406. When the cradle 117 has been moved in the manner above described to its horizontally offset position, one of the arms 123 operates the switch 452, closing the circuit through line 409 to the operating unit 88 operating valve 86 and putting means g in operation to advance the rod 60. Switch 452 is a safety switch which prevents the rod 60 from being advanced until arms 123 have shifted out of the path of the rod 60 and of the parts carried thereby. The rod cannot advance until switch 452 is operated by the arm 123.

When the cradle 117 has been moved in the manner just described to its horizontally offset position, a switch 450 is operated by being engaged by a part, such as one of the arms 123, with consequent closing of a circuit through a line 451, which results in energization of the actuating unit 166 of valve 165. This operation of valve 165 operates the means j so that the cradle is rocked or tilted to a position such as is shown in Fig. 30, which operation results in the pipe rolling or falling by gravity from the cradle 117 to the seat 173 of mechanism L.

A normally closed switch 460 is tripped and operated or opened by cam 377 on the rod 60 when the rod has been operated to a point where the plug 51 is close to or approaching the socket 50. The opening of switch 460 opens relay 433, opening the circuit to the operating unit 139 of valve 138 and resulting in a reversal of means i, whereupon the rocker 122 is returned to its phantom outline position shown in Fig. 14. Thus, as the arms 123 are operated as will be described, they swing out or away from the rocker and down, rather than horizontally, in returning to their extended positions.

Upon completion of the operating or tilting of the rocker 122 in the manner just described, a switch 470 is closed. Switch 470 controls the holding coil 440 of relay 431. Energization of relay 431 closes switch 442, completing a circuit through a line 446 to actuating unit 156 of valve 155. This causes operation of means h so that the arms 123 are operated to the extended positions after the return rocking or the tilting of the rocker 122 under the action of means i.

As the last described movement of arms 123 starts, switch 450, which had been held closed by an arm 123, is opened, with consequent opening of the circuit through line 451. This results in operation of valve 165 and actuation of means j so that the cradle is moved or returned from the rocked position to the initial position, ready to receive and support a pipe when the rocker is operated to elevate the cradle into engagement with the pipe, as shown in Fig. 14.

When the seat 173 of the pipe finishing means L receives the pipe from the cradle, it is operated or depressed, as hereinabove described, until it reaches a position supporting the pipe in alignment with the trimming mechanisms. When the seat 173 reaches this position, a switch 480 is closed by being engaged by the seat 173, closing a circuit through a relay 481 by the closing of switch 482 in the relay. The circuit closed by switch 482 is carried by a line 483, and when this circuit is energized, the actuating unit 237 is energized, operating a valve 271 with consequent operation of the two power means k of the two trimming mechanisms for movement of the trimming mechanisms into engagement with the pipe, simultaneously, at both ends of the pipe. The closing of relay 481 occurs while switch 418 of relay 372 is closed and the circuit to switch 482 of relay 481 is through line 419 from switch 418, which circuit is at that time energized. The two power means k of the trimming mechanisms remain operated with the trimming mechanisms engaged with the pipe until switch 418 opens, as hereinabove described, whereupon the circuit through line 419, switch 482, and line 483 opens; and the operation of the two means k reverses, with consequent withdrawal of the trimming mechanisms from the pipe.

As the two means k operate for retracting the trimming mechanisms from the pipe, the carriages of the trimming mechanisms operate switches 490 and 491, which are in series in a circuit controlling a relay 492. One of these switches, namely 490, is such as to remain closed when thus operated by the carriage that engages it, while the other, namely switch 491, is a trip switch only momentarily closed when operated by the carriage that engages it. The switches 490 and 491, in series when operated, close relay 492 by energizing the holding coil 494 thereof. Operation of relay 492 closes switches 495 and 496, switch 495 being in the holding circuit to the coil 494 of relay 492. Switch 496, when closed, completes a circuit through line 497 which controls the operating unit 202 of valve 201 to cause operation of means b, with consequent operation of the transferring means and movement of the seat 173 from the position where it supports the pipe in line with the trimming mechanisms to the discharge position where the pipe rolls by gravity into the main jaw 276 of the gripper of the turning and positioning mechanism P.

Rolling of the pipe from the seat 173 results in the seat returning to the elevated position shown in Fig. 14, thus opening or releasing switch 480 that opens or drops relay 481, with consequent opening of switch 497ᵃ in relay 481, which switch 497ᵃ is in the holding circuit of relay 492. The result is that relay 492 is opened or dropped, with consequent reversal of operation of valve 201 so that the transfer means operates to return the seat 173 to the position shown in Fig. 14, readying the seat for reception of the next pipe.

Engagement of the pipe in the main jaw 276 operates switch 288 through the trigger 289 to close a circuit through line 505 to relay 506. A switch 500 in the line 505 is in series with switch 288 and is normally closed. Energization of relay 506 closes a holding circuit through a switch 507 of relay 506 and closes a switch 508 controlling a line 509 to operating unit 287 of valve 286 so that means c is operated, causing the clamp jaw 277 to be operated to the closed or pipe embracing position. This closing or operation of the clamp jaw 277 closes switch 302 in a line 510 leading to a relay 511, thus operating the relay 511 so that its holding coil 512 is energized and a switch 513 in this relay is closed, completing a circuit through line 514 to a line 515 connected with the operating unit 301 of valve 300, with consequent operation of means d so that the clamp device is rocked from the horizontal position to the vertical position. Upon reaching the vertical position, the clamp device holding the pipe operates a switch 290 opening the circuit through switch 407, with consequent operation of relay 506, so that switch 508 is opened and the clamp device is operated to cause the jaws to open for releasing or freeing the pipe.

As the clamp jaw 277 of the clamp device opens, switch 302 is operated, opening the circuit to relay 511 with consequent operation of switch 513 and operation of the means d so that the clamp device is returned to the horizontal position where it is ready to receive the next pipe. When the clamp device has been returned to position ready to receive the next pipe, switch 500 is operated, setting the mechanism ready for the next cycle of operation.

As the means d started operation as hereinabove described, resulting from operation of switch 500, the switch 500 closed a circuit through a line 520 controlling the operating unit 319 of valve 318 with consequent operation of power means e on the pipe handling means R, causing movement of the pallet 310 supporting the previously deposited pipe so that the said previously deposited pipe is shifted onto the conveyor 313 while an unoccupied pallet is moved onto the support 312 to receive the pipe in the clamp device, as the clamp device is operated to the vertical position. Return of the clamp device to the horizontal position ready to receive a pipe operates switch 500 with consequent reversal of operation of the means e and consequent return of the pusher 311 to the position shown in Fig. 21, where it is ready to receive another pallet which, on the next operation, will be pushed into pipe receiving position and will push the loaded pallet onto the conveyor.

Operation of the means c to the shifted position causes closing of switch 502 by the pusher 311. Switch 502 is in the line 510 to the relay coil 512. Operation of relay coil 512 and consequent operation of means d cannot occur when the switch 502 is open. Therefore, the turner will not operate until the pusher has operated to move a new pallet into position, which operation pushes the previously loaded pallet from the support 312 to the conveyor.

Having described only a typical preferred form of apparatus and a typical manner of carrying out the method of my invention, I do not wish to be limited or restricted to the specific details herein set forth, but wish to reserve to myself any variations or modifications that may appear to those skilled in the art and fall within the scope of the following claims.

I claim:

1. The method of molding clay pipe with a belled end comprising extruding clay horizontally and under pressure into and through a tubular mold so as to progressively feed from the mold a tubular body of clay having a belled leading end, maintaining said body under longitudinal compression during its emergence from the mold by exerting a yielding axial pressure against the belled end, sufficient to maintain axial alignment of the body with the mold while maintaining the body otherwise free from transverse support beyond the mold, moving a support into transverse supporting engagement with the body rearwardly of the belled end thereof, relieving said axial pressure after the body is so engaged by the support, whereby the support maintains axial alignment of the body with the mold without engaging the belled end thereof, interrupting the extrusion when the body has acquired a predetermined length, severing the body from clay remaining in the mold, and shifting the severed body laterally to one side of the axis of the mold out of the path of a subsequent extrusion while maintaining the body horizontally disposed for lateral movement to succeeding stations.

2. The method of claim 1 in which said axial pressure is maintained until the body has acquired said predetermined length.

3. The method of claim 1 in which the body is maintained otherwise free from transverse support between the mold and the leading end thereof until the body has acquired said predetermined length.

4. The method of claim 1 in which said axial pressure is maintained and the body is maintained otherwise free from transverse support beyond the mold until the body has acquired said predetermined length.

5. The method of molding clay pipe with a belled end comprising extruding clay horizontally and under pressure into and through a tubular mold so as to progressively feed from the mold a tubular body of clay having a belled leading end, maintaining said body under longitudinal compression during its emergence from the mold by exerting a yielding axial pressure against the belled end sufficient to maintain axial alignment of the body with the mold while maintaining the body otherwise free from transverse support beyond the mold, moving a support into transverse supporting engagement with the body rearwardly of the belled end thereof, relieving said axial pressure after the body is so engaged by the support, whereby the support maintains axial alignment of the body with the mold without engaging the belled end thereof, interrupting the extrusion when the body has acquired a predetermined length, severing the body from clay remaining in the mold, and shifting the severed body laterally to one side of the axis of the mold out of the path of a subsequent extrusion while maintaining it horizontally disposed and free from transverse support along the belled portion thereof.

6. The method of molding clay pipe with a belled end comprising extruding clay horizontally and under pressure into and through a tubular mold so as to progressively feed from the mold a tubular body of clay having a belled leading end, maintaining said body under longitudinal compression during its emergence from the mold by exerting a yielding axial pressure against the belled end sufficient to maintain axial alignment of the body with the mold while maintaining the body otherwise free from transverse support beyond the mold, moving a support into transverse supporting engagement with the body rearwardly of the belled end thereof, relieving said axial pressure after the body is so engaged by the support, whereby the support maintains axial alignment of the body with the mold without engaging the belled end thereof, interrupting the extrusion when the body has acquired a predetermined length, severing the body from clay remaining in the mold, and shifting the severed body laterally to one side of the axis of the mold out of the path of a subsequent extrusion at least in part with a rolling motion while maintaining it horizontally disposed and maintaining it free from transverse support along the belled portion thereof.

7. The method of molding clay pipe with a belled end comprising extruding clay horizontally and under pressure into and through a tubular mold so as to progressively feed from the mold a tubular body of clay having a belled leading end, maintaining said body under longitudinal compression during its emergence from the mold by exerting a yielding axial pressure against the belled end sufficient to maintain axial alignment of the body with the mold while maintaining the body otherwise free from transverse support beyond the mold, moving a support into transverse supporting engagement with the body rearwardly of the belled end thereof, relieving said axial pressure after the body is so engaged by the support, whereby the support maintains axial alignment of the body with the mold without engaging the belled end thereof, interrupting the extrusion when the body has acquired a predetermined length, severing the body from clay remaining in the mold, and shifting the severed body laterally to a succeeding station to one side of the axis of the mold and out of the path of a subsequent extrusion while maintaining the body horizontally disposed and free from transverse support along the belled portion thereof.

8. The method of molding clay pipe with a belled end comprising extruding clay horizontally and under pressure into and through a tubular mold so as to progressively feed from the mold a tubular body of clay having a belled leading end, maintaining said body under longitudinal compression during its emergence from the mold by exerting a yielding axial pressure against the belled end sufficient to maintain axial alignment of the body with the mold while maintaining the body otherwise free from transverse support beyond the mold, moving a support into transverse supporting engagement with the body rearwardly of the belled end thereof, relieving said axial pressure after the body is so engaged by the support, whereby the support maintains axial alignment of the body with the mold without engaging the belled end thereof, interrupting the extrusion when the body has acquired a predetermined length, severing the body from clay remaining in the mold, and shifting the severed body laterally out of the path of a subsequent extrusion from one to another of a plurality of succeeding stations while maintaining the axis of the body horizontal, said shifting being at least in part with a rolling motion.

9. The method of molding clay pipe with a belled end comprising extruding clay horizontally and under pressure into and through a tubular mold so as to progressively feed from the mold a tubular body of clay having a belled leading end, maintaining said body under longitudinal compression during its emergence from the mold by exerting a yielding axial pressure against the belled end sufficient to maintain axial alignment of the body with the mold while maintaining the body otherwise free from transverse support beyond the mold, moving a support into transverse supporting engagement with the body rearwardly of the belled end thereof, relieving said axial pressure after the body is so engaged by the support, whereby the support maintains axial alignment of the body with the mold without engaging the belled end thereof, interrupting the extrusion when the body has acquired a predetermined length, severing the body from clay remaining in the mold, and shifting the severed body laterally out of the path of a subsequent extrusion to at least one succeeding station, said shifting being at least in part with a rolling motion, gripping the body while it is at the last of said succeeding stations, while continuing to maintain the belled portion of the body free from transverse support, and turning the body while so gripped and depositing it in a vertical position with its belled end up and its opposite end resting on a support for further transfer.

10. The method of claim 9 in which said body, while gripped and being turned, is shifted transversely and out of its path of travel to the last of said succeeding stations.

References Cited in the file of this patent

UNITED STATES PATENTS

| | | |
|---|---|---|
| 251,376 | Nolan | Dec. 27, 1881 |
| 300,909 | Smith | June 24, 1884 |
| 1,651,203 | Hibbins | Nov. 29, 1927 |
| 1,789,558 | Makowski | Jan. 20, 1931 |
| 1,978,420 | Dyer | Oct. 30, 1934 |
| 2,010,820 | Tarson | Aug. 13, 1935 |
| 2,391,424 | Keplinger et al. | Dec. 15, 1945 |
| 2,451,713 | Brown et al. | Oct. 19, 1948 |
| 2,591,267 | Lacy et al. | Apr. 1, 1952 |
| 2,611,941 | Leitl | Sept. 30, 1952 |
| 2,630,613 | Webb | Mar. 10, 1953 |
| 2,642,643 | Montague | June 23, 1953 |